United States Patent
Groarke et al.

(10) Patent No.: US 7,561,303 B2
(45) Date of Patent: Jul. 14, 2009

(54) CACHING AND OPTIMISATION OF COMPOSITING

(75) Inventors: Vincent Groarke, Cork (IE); Timothy Jan Schmidt, Barcelona (ES)

(73) Assignee: Canon Kabushiki Kaisha, Tokyo (JP)

( * ) Notice: Subject to any disclaimer, the term of this patent is extended or adjusted under 35 U.S.C. 154(b) by 588 days.

(21) Appl. No.: 11/275,137

(22) Filed: Dec. 14, 2005

(65) Prior Publication Data

US 2006/0192983 A1    Aug. 31, 2006

(30) Foreign Application Priority Data

Dec. 14, 2004   (AU)   ............... 2004237908
Dec. 20, 2004   (AU)   ............... 2004240230

(51) Int. Cl.
*H04N 1/405*   (2006.01)
(52) U.S. Cl. ............... 358/1.9; 358/3.15; 358/3.2
(58) Field of Classification Search ............... 358/2.1, 358/3.2, 3.15, 1.9; 382/242–243
See application file for complete search history.

(56) References Cited

U.S. PATENT DOCUMENTS

| | | | |
|---|---|---|---|
| 5,850,504 | A | 12/1998 | Cooper et al. |
| 5,930,469 | A | 7/1999 | Chiarabini et al. |
| 2003/0235327 | A1 | 12/2003 | Srinivasa |

*Primary Examiner*—Thomas D Lee
*Assistant Examiner*—Stephen M Brinich
(74) *Attorney, Agent, or Firm*—Fitzpatrick, Cella, Harper & Scinto

(57) ABSTRACT

A method (1500) of generating a representation of a page (1000) to be rendered is disclosed. The page (1000) comprises one or more graphic objects (1080, 1090), each being defined by two or more edges bounding a fill. The method (1500) operates by partitioning the page (1000) into a plurality of regions, each region having a corresponding sequence of fills adapted to be composited to generate a colour for each pixel location within the region upon rendering. Then, the representation is generated such that at least two regions reference a common fill sequence.

14 Claims, 21 Drawing Sheets

CACHING AND OPTIMISATION OF COMPOSITING

FIELD OF THE INVENTION

The present invention relates generally to computer-based printer systems and, in particular, to inexpensive printer systems for high-speed printing.

BACKGROUND

A computer application typically provides a page to a device for printing and/or display in the form of a description of the page, with the description provided to device driver software of the device in a page description language (PDL), such as Adobe® PostScript® or Hewlett-Packard® PCL. The PDL provides descriptions of objects to be rendered onto the page, as opposed to a raster image of the page to be printed. Equivalently, a set of descriptions of graphic objects may be provided in function calls to a graphics interface, such as the Graphical Device Interface (GDI) in the Microsoft Windows™ operating system, or the X-11 in the Unix™ operating system. The page is typically rendered for printing and/or display by an object-based graphics system, also known as a Raster Image Processor (RIP).

A typical printer system comprises a host computer, such as a personal computer (PC), connected to a printer by some interface. Example interfaces include a parallel port, Universal Serial Bus (USB), Ethernet or Firewire™. In a typical office environment the host computer to printer connection may be over a 10/100BaseT Ethernet network that is shared with other users and equipment. In such cases the bandwidth of the network is not exclusively available for host computer to printer data transfer. For this reason it is desirable that the amount of data that is sent from the host computer to the printer, and any data and/or status information sent in the opposite direction, be kept to a minimum. The actual time spent transmitting the description of the page from the host computer to the printer impacts on the overall printing time from a user's perspective. The choice of a particular PDL is therefore a crucial factor in minimising the time taken to transfer the page description from the host computer to the printer.

In a PDL-based printer the PDL file that describes the page is delivered over the interface from the host computer. Such a PDL-based printer system requires that the printer itself implement PDL interpretation in the course of generating the pixels for printing. PDL interpretation is a task that requires considerable software and/or hardware resources to perform in a reasonable time.

The advantage of such a system including a PDL-based printer is that the amount of data, that is the description in the PDL, which needs to be transferred over the interface is typically small compared to the corresponding pixel data subsequently generated within the printer. This is especially true as the resolution of the printed page increases. In addition, the overall print time of the system, defined roughly as the time from when the user commands the printing of the page to its final arrival out of the printer, is not particularly sensitive to reductions in interface bandwidth. This is because the majority of the overall printing time is consumed by the interpretation of the description in the PDL and the subsequent generation of pixels within the printer, as opposed to the transfer of the description from the host computer to the printer.

In contrast to the system including a PDL-based printer, a system using a host-based printer system architecture divides the processing load between the host computer and the printer in a different manner. Host-based printer systems require the host computer, typically a personal computer, to fully generate pixel data at the resolution of the page to be printed. This pixel data is then compressed in a lossless or lossy fashion on the host computer and is delivered to the printer across the interface. Sometimes halftoning is also performed on this pixel data on the host computer to reduce the size of the pixel data. This approach is also known as the bitmap approach.

A significant advantage of this bitmap approach is that the printer need not be capable of PDL interpretation. By removing the task of PDL interpretation from the printer to the host computer, the complexity of the printer's role is greatly reduced when compared to that of the PDL-based printer. Since complexity usually translates into cost, the printer for the host-based system can generally be made more cheaply than one that needs to perform PDL interpretation for an equivalent printing speed and page quality.

The disadvantage of such host-based printing systems is the amount of data that needs to be delivered from host computer to the printer across the interface. An A4 page at 600 dpi resolution may require over one hundred megabytes of pixel data to be transferred across this interface when uncompressed. Compressing the pixel data alleviates the problem to some extent, particularly when the pixel data has already been halftoned. However, the data transfer still typically requires many megabytes of compressed pixel data. Apart from the time and memory resource required to process this data in the printer, considerable time is also consumed in simply waiting for these compressed pixels to make their way across the interface from the host computer to the printer. Consequently the host-based printer system is particularly sensitive to increases in page resolution and reduced interface data bandwidth.

A need therefore exists for a representation of a page to be rendered on a printer system that removes the requirement of the printer system to be capable of PDL interpretation without the representation consisting of a large amount of data.

SUMMARY

It is an object of the present invention to substantially overcome, or at least ameliorate, one or more disadvantages of existing arrangements.

According to a first aspect of the present disclosure, there is provided a method of generating a representation of a page to be rendered, said page comprising one or more graphic objects, each graphic object being defined by two or more edges bounding a primitive fill, said method comprising the steps of:

partitioning said page into a plurality of non-overlapping regions, each region having a corresponding fill generated by the compositing of a sequence of primitive fills to be composited to generate the fill for said region upon rendering;

for at least one of said regions, determining an optimised equivalent fill sequence that results, when composited, in substantially the same fill as said corresponding fill; and representing each region such that at least one further region references said optimised equivalent fill sequence instead of the fill sequence corresponding to said further region.

According to a second aspect of the present disclosure, there is provided a representation of a page to be rendered, said page comprising one or more graphic objects, each graphic object being defined by two or more edges bounding a primitive fill, said representation comprising:

data identifying a plurality of non-overlapping regions; and a corresponding fill for each region generated by the compositing of a sequence of primitive fills to be composited to generate the fill for said region upon rendering wherein, for at least one of said regions, said sequence of primitive fills is an optimised equivalent fill sequence that results, when composited, in substantially the same fill as said corresponding fill, and wherein at least one further region references said optimised equivalent fill sequence instead of the fill sequence corresponding to said further region.

According to another aspect of the present disclosure, there is provided a method of rendering a page, said page comprising one or more graphic objects, each graphic object being defined by two or more edges bounding a primitive fill, said method comprising the steps of:

receiving a representation of said page, said representation comprising:

data identifying a plurality of regions; and a corresponding fill for each region to be generated upon rendering by the compositing of a corresponding sequence of primitive fills wherein, for at least one of said regions, said sequence of primitive fills is an optimised equivalent fill sequence that results, when composited, in substantially the same fill as said corresponding fill, and wherein at least one further region references said optimised equivalent fill sequence wherein the fill sequence corresponding to said further region is different from said optimised equivalent fill sequence;

determining from said data identifying said plurality of regions the pixel locations at which a current scanline crosses boundaries of said regions;

associating with each span of pixels in said current scanline one of said regions, each span of pixels being defined by two of said pixel locations; and rendering said spans of pixels on said current scanline using the fill corresponding to the identified region.

According to another aspect of the present disclosure, there is provided an apparatus for implementing the aforementioned method.

According to another aspect of the present disclosure there is provided a computer program for implementing the method described above.

Other aspects of the invention are also disclosed.

BRIEF DESCRIPTION OF THE DRAWINGS

Some aspects of the prior art and one or more embodiments of the present invention will now be described with reference to the drawings, in which.

DETAILED DESCRIPTION

Figure 1:
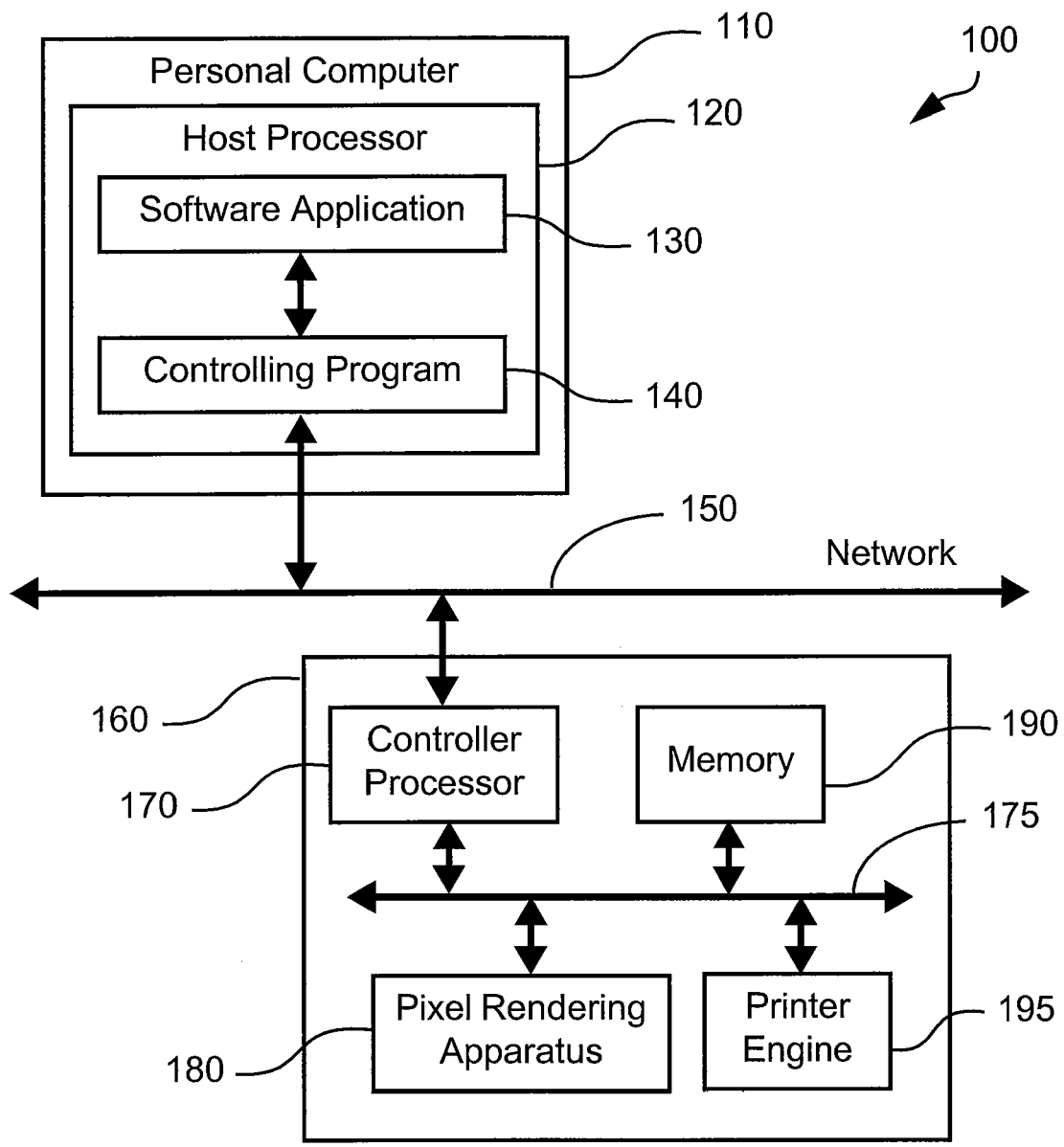
FIGS. 1, 2 and 3 show schematic block diagrams of prior art pixel rendering systems for rendering computer graphic object images.

Where reference is made in any one or more of the accompanying drawings to steps and/or features, which have the same reference numerals, those steps and/or features have for the purposes of this description the same function(s) or operation(s), unless the contrary intention appears.

Aspects of prior art pixel rendering systems are described before describing embodiments of the invention. It is noted however that the discussions contained in the "Background" section and the prior art system described below relate to systems which form prior art through their respective publication and/or use. However, such should not be interpreted as a representation by the present inventor(s) or patent applicant that such documents or systems in any way form part of the common general knowledge in the art.

FIG. 1 shows a schematic block diagram of a prior art pixel rendering system 100 for rendering computer graphic object images. The pixel rendering system 100 comprises a personal computer 110 connected to a printer system 160 through a network 150. The network 150 may be a typical network involving multiple personal computers, or may be a simple connection between a single personal computer and printer system 160.

The personal computer 110 comprises a host processor 120 for executing a software application 130, such as a word processor or graphical software application, and a controlling program 140, such as a driver on a Windows™ or Macintosh™ operating system.

The printer system 160 comprises a controller processor 170, memory 190, a pixel rendering apparatus 180, and a printer engine 195 coupled via a bus 175. The pixel rendering apparatus 180 is typically in the form of an ASIC card coupled via the bus 175 to the controller processor 170, and the printer engine 195. However, the pixel rendering apparatus 180 may also be implemented in software executed in the controller processor 170.

In the prior art pixel rendering system 100 each graphical object that is passed by the controlling program 140 to the pixel rendering apparatus 180 across the network 150 for processing is defined in terms of the following parameters:

edges—which describe the geometric shape of the graphical object;

a fill—which describes the colour, the opacity, the colour blend and/or the image to be painted within the shape of the object; and a level—which describes whether an object should be painted above or behind other objects, and how colour and opacity from an object should be combined with colour and opacity from other overlapping objects.

Describing each of the parameters of the graphical object in more detail, and starting with the edges, the edges are used to describe the boundaries of an object. Each edge is provided as a sequence of segments in a monotonically increasing Y sequence. Edge segments may be straight lines or may be any other type of curve, such as a Bezier curve. Edges may also be used to describe text objects by treating each glyph as a geometric shape whose boundaries are described by edges made up of straight-line segments. Edges are attributed a "direction" by the controlling program 140. This direction is a convention that the pixel rendering apparatus 180 uses to determine how an edge affects the activity of an object's level.

The fill is a description of the colour, pattern or image to be painted within the boundaries of the graphical object. The fill may be a flat fill representing a single colour, a blend representing a linearly varying colour, a bitmap image or a tiled (i.e. repeated) image. In each case the supplied fill is to be applied over the extent of the object. The controlling program 140 generates fill information for each object on a page that is used by the pixel rendering apparatus 180 during the rendering process.

Each object to be rendered is also assigned a level entry. An object's level entry indicates the relative viewing position of that object with respect to all other objects on a page.

In addition, each level entry created by the controlling program 140 also has a fill rule associated therewith, which may be "non-zero winding", or "odd-even fill". Each level has a fill-count, which is set to zero at the start of each scanline, during the rendering process. As the pixel rendering apparatus 180 processes a scanline working across the page, when a downwards heading edge is crossed, the fill-count of the level or levels associated with the edge is incremented. When an upwards heading edge is crossed, the fill-count of the level or levels associated with the edge is decremented. If a level has a non-zero winding fill rule, then the level is active if its associated fill-count is non-zero. If a level has an odd-even fill rule, then the level is active if its associated fill count is odd.

Yet further, the level entry defines the arithmetic or logical operation which specifies how the colour/opacity from this level is combined with the colour/opacity from other overlapping levels.

In the pixel rendering system 100, the software application 130 creates page-based documents where each page contains objects such as text, lines, fill regions, and image data. The software application 130 sends a page for printing, in the form of an application job, via a graphics application layer to the controlling program 140. In particular, the software application 130 calls sub-routines in a graphics application layer, such as GDI in Windows™, or X-11 in Unix™, which provide descriptions of the objects to be rendered onto the page, as opposed to a raster image to be printed.

The controlling program 140 receives the graphical objects from the application program 130, and constructs an instruction job containing a set of instructions, together with data representing graphical objects. In the present context a job represents one page of output. The job is then transferred to the controller processor 170, which controls the pixel rendering apparatus 180, for printing. In particular, a program executing on the controller processor 170 is responsible for receiving jobs from the controlling program 140, providing memory 190 for the pixel rendering apparatus 180, initialising the pixel rendering apparatus 180, supplying the pixel rendering apparatus 180 with the start location in memory 190 of the job, and instructing the pixel rendering apparatus 180 to start rendering the job.

The pixel rendering apparatus 180 then interprets the instructions and data in the job, and renders the page without further interaction from the controlling program 140. The output of the pixel rendering apparatus 180 is colour pixel data, which can be used by the output stage of the printer engine 195. The pixel rendering apparatus 180 employs a pixel-based sequential rendering method.

Figure 4:
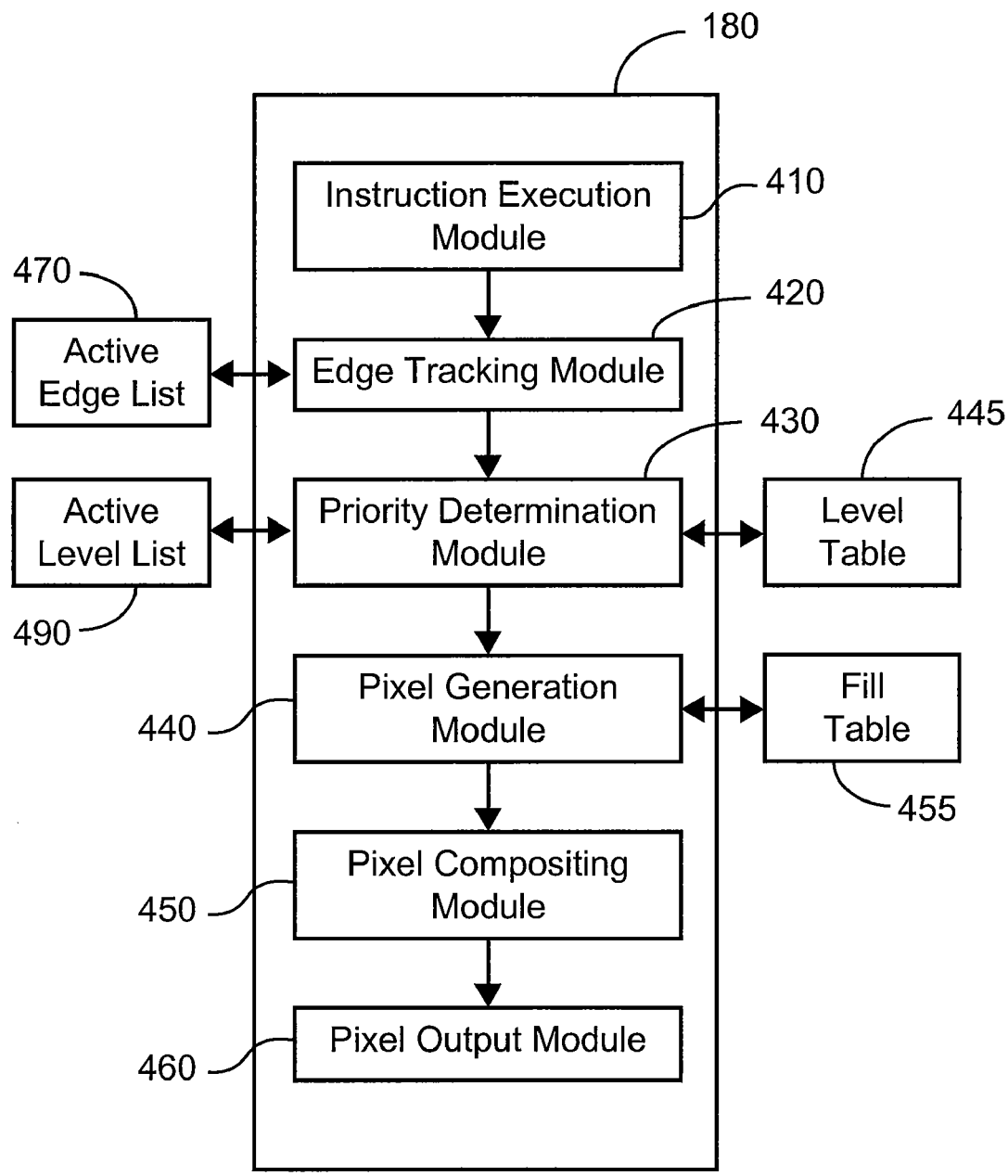
FIG. 4 shows a schematic block diagram of the functional blocks of a pixel rendering apparatus forming part of the prior art pixel rendering system of FIG. 1.

The pixel rendering apparatus 180 of FIG. 1 is shown in more detail in FIG. 4. The pixel rendering apparatus 180 comprises an instruction execution module 410; an edge tracking module 420; a priority determination module 430; a pixel generation module 440; a pixel compositing module 450; and a pixel output module 460 arranged in a pipeline. For each scanline the pixel rendering apparatus 180 processes each pixel in turn, considering the graphical objects that affect that pixel, to determine the final output for the pixel.

The instruction execution module 410 of the pixel rendering apparatus 180 reads and processes instructions from the instruction job that describes the pages to be printed and formats the instructions into information that is transferred to the other modules 420 to 460 within the pipeline.

One instruction is used to command the pixel rendering apparatus 180 to prepare to print a page of a particular dimension. Another instruction indicates that an edge or edges with particular characteristics start at a particular scanline at a particular x-position. Yet another instruction specifies that the pixel rendering apparatus 180 should load a particular level into the appropriate internal memory region used to hold level information. Yet another instruction specifies that the pixel rendering apparatus 180 should load a particular fill into the appropriate internal memory region used to hold fill information within the printer system 160. Yet another instruction specifies that a particular data set (e.g. a compressed bitmap for example) should be decompressed using a specified decompression algorithm. The data set to be decompressed must be available in the memory 190 of the printer system 160 before such an instruction is executed by the pixel rendering apparatus 180. Other instructions relevant to the rendering of a page are also decoded by the pixel rendering apparatus's instruction execution module 410.

When executing the instruction job the instruction execution module 410 processes the instructions sequentially. On encountering an instruction to load an edge or edges at a specific scanline the instruction execution module 410 extracts relevant information regarding the edge and passes this information onto the edge tracking module 420.

The edge tracking module 420 is responsible for determining the edges of those graphical objects of the instruction job that intersect the currently scanned pixel and passes this information onto the priority determination module 430. When creating the instruction job the controlling program 140 inserts instructions to start an edge or edges in the appropriate order and at the appropriate scanline such that the pixel rendering apparatus 180 maintains a correct list of active edges at every scanline of the page when rendering.

When the edge tracking module 420 receives edge information from the instruction execution module 410, the edge tracking module 420 updates an active edge list 470. The active edge list 470 contains a sorted list of the active edges on the current scanline being rendered by the pixel rendering apparatus 180. The active edge list 470 is updated by inserting the incoming edges into the active edge list 470 and sorting this list by each edge's current x-position.

Once a scanline has been rendered, each edge has its x-position updated by executing each edge's x-position update function. This function returns the edge's x-position for the next scanline render. In the case that an edge terminates before the next scanline, that edge is removed from the active edge list 470. When edges cross the active edge list 470 is resorted.

For each edge that is stored in the active edge list 470 a level or levels will be added or removed from an active level list 490 that is maintained by the priority determination module 430. As the active edge list 470 is traversed level or levels are added to or removed from the active level list 490. The span of pixels between a pair of edges has therefore an active level list 490 that is used to control the compositing of the pixel contributions from each level in the active level list 490.

The priority determination module 430 is pre-loaded with a level table 445 from the instruction job. The level table 445 contains an entry for each graphical object consisting of its z-order position on the page, how the colour of the object should be combined with other objects (compositing operators), and other data. The priority determination module 430 is responsible for determining those objects, so called active objects, that make a visual contribution to the currently scanned pixel and passes that information onto the pixel generation module 440.

The information passed from the pixel determination module 430 to the pixel generation module 440 includes an index that references the fill of a corresponding active object in a fill table 455. The pixel generation module 440 is pre-loaded with the fill table 455 from the instruction job. The fill table 455 contains an entry for each graphical object consisting of the graphical object's fill and other data. The pixel generation module 440, upon receiving information from the priority determination module 430, is responsible for referencing the index into the fill table 455, and using the data therein to generate colour and opacity information which is passed onto the pixel compositing module 450.

The pixel compositing module 450 is responsible for obtaining the final colour for the currently scanned pixel by compositing the fill colours in accordance with the compositing operators as indicated in the rendering instructions. For each level in the active level list 490 for a particular pixel span, the pixels corresponding to the level's object are determined by reference to the fill that is linked to that level. In the case of a simple flat fill, this reference is a trivial lookup of the colour of that object. However, for a bitmap fill a 2-D affine transformation is applied to the (x, y) location of each pixel in the span to determine the source data to be used to colour the pixel on the page, including some interpolation method if required. Similarly a non-trivial calculation is required for any other fill type that relates a pixel's location on the page to the fill data stored within the printer system's fill table 455, such as a linear gradient.

In order to determine the final colour of pixels within a span, the contributions of each level are composited together. Compositing is performed using the transparency of the contributing levels, the colours of the contributing levels and the raster operation specified for each level in the active level list 490. For a span where the fills of all the contributing levels for this span each reference a single colour, the compositing algorithm need only compute the resultant colour from compositing one pixel and then repeat this pixel for the whole span.

For a span where the fills of all the contributing levels for this span are of type bitmap or gradient for example, the compositing algorithm needs to compute the resultant colour from compositing all the pixels in the span in turn.

The final output colour of the pixel is passed onto the pixel output module 460, which is subsequently passed to the printer engine 195.

The pixel rendering apparatus 180 described above considers each output pixel fully, applying all required compositing operations before moving onto the next pixel in the raster output. This method is efficient in an ASIC implementation, but is not the most optimal implementation in software. A variation on this pixel rendering apparatus 180 is possible which offers advantages when implemented in software. In this variation, the pixel rendering apparatus 180 applies one of the required compositing operations to all contributing pixels within a span (between two successive edges), before applying the next compositing operation. Once all required compositing operations have been so applied, the resulting pixel span has been fully processed and may be passed to the pixel output module 460. The next pixel span is then considered.

The distribution of the computational burden of rendering in the pixel rendering system 100 shown in FIG. 1 between the personal computer 110 and the printer system 160 sees the compositing of pixels being performed on the printer system 160 by the pixel rendering apparatus 180. Compositing in a span where there are N active levels is an order-N algorithm. Computing the contribution of each level in the active level list 490 for a page with many overlapping objects can be very time consuming using the process described above, since the contribution of each level must be calculated for each pixel span. If the fills linked to the active levels within a span are of type flat colour then only a single pixel within the span needs to be individually calculated using the compositing algorithm. All other pixels within the span will be identical. However, if the fills linked to the active levels within a span are of type bitmap, or another non-flat fill, then each pixel within the span needs to be individually calculated using the compositing algorithm.

In order to render in real time for a laser beam printer running at a rated page per minute speed, the processing load on the printer due to compositing must be quantified and catered for in specifying the resource requirements of the printer system 160. In particular, the processing power and memory resources of the printer system 160 must be such that at no time does the pixel rendering apparatus 180 fail to keep up with the consumption of pixels by the printer engine 195 when the laser printer is actually printing the page.

In addition to the compositing of pixels on the page, another task that is performed typically in the printer system 160 is that of Colour Space Conversion (CSC). Compositing typically takes place in the RGB (Red Green Blue) colour space and hence a CSC is required following the step of compositing before pixels can be shipped to the printer engine 195 for printing onto the page. CSC between the RGB colour space typically used when compositing and the CMYK colour space required by the printer is a non-linear operation where typically each of the Cyan, Magenta, Yellow and Black components are functions of all three RGB components. CSC places a certain processing burden on the printer system 160 in order to be executed in a timely manner for real time printing on a laser beam printer.

Yet another task that is performed typically in the printer system 160 is that of halftoning. Halftoning is applied to pixels that are at page resolution as a method of reducing the size of data to be transferred to the printer engine 195. In a typical halftoning implementation tables are used to reduce each colour channel from an 8-bit value to a 4-bit, 2-bit or 1-bit value.

The operation of the pixel rendering system 100 in processing an instruction job is now described with reference to FIG. 5 wherein two graphical objects 510 and 520 on a page 500 are illustrated. The graphical objects are a triangle 510 with a light grey flat fill, and a square 520 with a dark grey flat fill. The triangle 510 is above the square 520, and also partially overlaps the square 520. The triangle 510 is partially transparent while the square 520 is fully opaque. The background of page 500 is white.

In the prior art pixel rendering system 100 the controlling program 140 constructs an instruction job wherein the triangle 510 is described by two edges 580 and 585. The first edge 580 is downwards heading, and consists of two segments 581 and 582. The second edge 585 is upwards heading and consists of a single segment. The square 520 is also described by two edges 590 and 595. The first edge 590 is downwards heading, and consists of one segment. The second edge 595 is upwards heading and also consists of one segment only.

Figure 5:
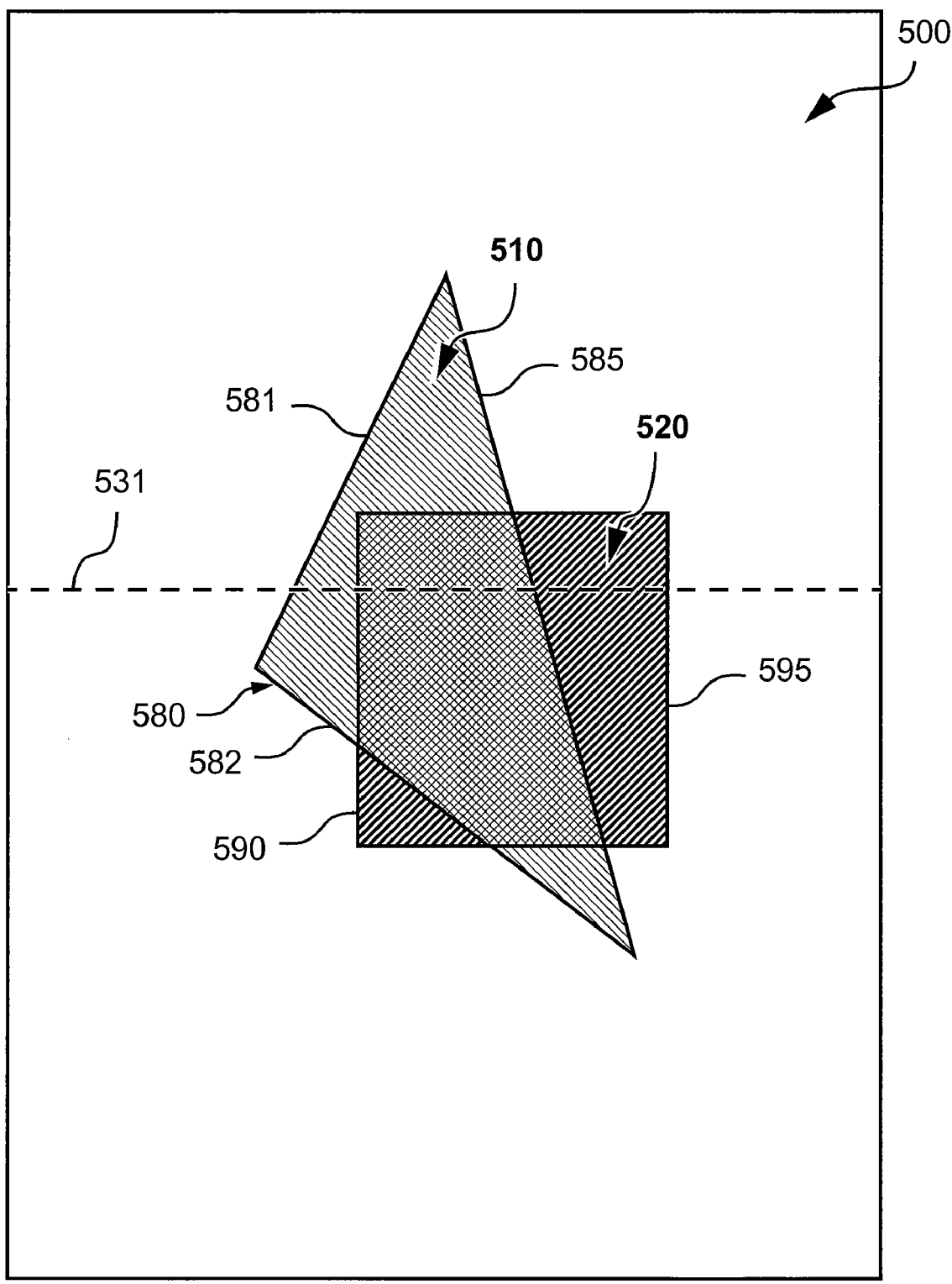
FIG. 5 illustrates schematically two overlapping objects for the purposes of illustrating how the prior art pixel rendering systems shown in FIGS. 1 to 3 render a page.

The following table shows the edges that the controlling program 160 generates for the objects 510 and 520 in FIG. 5:

TABLE 1

Edges created for objects in FIG. 5

| Object | Edges | Direction | Number of Segments | Associated Level Index |
|---|---|---|---|---|
| Square 520 | 590 | Down | 1 | 0 |
|  | 595 | Up | 1 | 0 |
| Triangle 510 | 580 | Down | 2 | 1 |
|  | 585 | Up | 1 | 1 |

The controlling program 140 generates two level entries in the level table 445 (FIG. 4) for the objects in FIG. 5 as follows:

TABLE 2

Level Table created for objects in FIG. 5

| Level Index | Associated Fill Index | Other Data |
|---|---|---|
| 0 | 0 (Fa) | ... |
| 1 | 1 (Fb) | ... |

Within the instruction job the controlling program 140 generates two fill entries in the fill table 455 (FIG. 4) as follows:

TABLE 3

Fill Table created for objects in FIG. 5

| Fill Index | Name | Type | Color | Opacity | Other Data |
|---|---|---|---|---|---|
| 0 | Fa | Flat | Dark grey | 100% | — |
| 1 | Fb | Flat | Light grey | 50% | — |

To understand how the pixel rendering apparatus 180 renders the objects on page 500, consider scanline 531 in FIG. 5. When rendering this scanline 531 no levels are active until segment 581 of edge 580 is encountered. For this reason the colour output by the pixel rendering apparatus 180 is white from the left of the page 500 up until edge 580.

At edge 580 level 1 is activated. Between edge 580 and edge 590 the active level list 490 contains only level 1. The colour defined by level 1's fill entry is light grey. Therefore, a span of light grey pixels is output by the pixel rendering apparatus 180 for those pixels between edge 580 and edge 590.

At edge 590 level 0 is activated. Between edge 590 and edge 585 the active level list 490 contains both level 0 and level 1. The colour defined by level 0's fill entry is dark grey and the colour defined by level 1's fill entry is light grey. Therefore, a span of grey pixels is output by the pixel rendering apparatus 180 for the pixels between edge 590 and edge 585, that being the colour that results from compositing the two colours of the objects 510 and 520 using each object's respective level entry to control the proportions of each object's colour.

At edge 585 level 1 is deactivated. Between edge 585 and edge 595 the active level list 490 contains only level 0. The colour defined by level 0's fill entry is dark grey. Therefore, a span of dark grey pixels is output by the pixel rendering apparatus 180 for those pixels between edge 585 and edge 595.

At edge 595 level 0 is deactivated. Between edge 595 and the right hand edge of the page 500 the active level list 490 contains no levels. Therefore a span of white pixels is output by the pixel rendering apparatus 180 for those pixels between edge 595 and the right hand edge of the page 500.

This example shows the basis on which the pixel rendering apparatus 180 works, and shows simple examples of a fill table 455 and a level table 445. In most print jobs the fill table 455 and the level table 445 are far more complex, and typically contain many entries. In complex print jobs the number of entries can be very large, necessitating methods to deal with such table sizes.

Due to the processing load required for pixel compositing placed on the pixel rendering apparatus 180, the use of the pixel rendering system 100 for low-cost real-time printing on a laser beam printer is unsuitable. The reason is that, when a print system is designed to render in real time, this implies that the worst case instruction job must be renderable within the time constraints imposed by the print engine speed if a full framestore is not to be employed in the printer system 160. Once the paper has started to roll past the toner drums a laser beam printer may not be stopped in order to allow a rendering engine to catch-up in the generation of pixel data.

In many print jobs (such as text only) there is usually no compositing to be performed and the pixel rendering system 100 is capable of real time rendering without extravagant processing and memory resources in the printer system 160. In a text only page the majority of processing in the pixel rendering apparatus 180 is consumed by edge tracking. In many simple cases where there are no overlapping objects it is not a cost effective solution to provide a printer that is capable of multi-level compositing. The proportion of pages that require compositing will depend on the user's use profile. For the printing of documents that are primarily text the priority determination module 430 will in many cases be running only a trivial single level resolution for each span. A printer with reduced resources (and hence cost) would be capable of rendering such pages in a similar time frame.

However, for very complicated jobs with hundreds of overlapping transparent bitmaps for example, the burden of compositing would require considerable processing and memory resources to be available on the printer system 160 to allow such a page to be rendered in real time. For high page rates and page resolution, the cost of a printer that contains a real time pixel render engine capable of rendering such complicated pages could be prohibitive.

For this reason the provision of the function of compositing in the printer is not seen as providing a cost effective solution since such a printer would need to handle both the very simple and the very complicated cases with the same low-cost hardware and software resources.

As described earlier an object's boundaries are decomposed into edges by the controlling program 140. The relative viewing position of each object is explicitly coded in the level associated with an object's edges and an object's pixel colours are stored in a fill. This information is generated by the controlling program 140 for each object on the page. These edges, levels and fills are then encoded in an instruction job together with other relevant information to be rendered by the pixel rendering apparatus 180.

In some cases an object's edges will be completely obscured by an overlaying opaque object. An object that is fully obscured by an overlying object will not contribute anything to the pixels on a page. In such cases, the edge information, the level and the fill created by the controlling program 140 for the obscured object are redundant in the instruction job. However the controlling program 140 in the pixel rendering system 100 does not discriminate between such obscured objects and objects that are visible on a page, placing all edges levels and fills in the instruction job.

This limitation introduces redundancy in the size of the instruction job created by the controlling program 140 when objects are fully obscured by other objects. This limitation also may introduce redundancy in the size of the instruction job created by the controlling program 140 when objects partially obscure other objects. This redundancy results in a reduction in speed of the subsequent processing of the instruction job. This redundancy also means that the pixel rendering apparatus 180 uses more memory resources than if such redundancy were removed before the instruction job were created.

Whether or not one object partially or fully obscures other objects depends on the relative positions of the edges of the objects. If the edges of the object should cross one another then the objects can be said to overlap. Furthermore, if edges of objects do not cross at any time, the objects either overlap fully or do not overlap at all. It is only by tracking the edges' relative positions that a decision can be made on whether objects overlap fully or not at all. When the number of objects on a page is large the algorithm to determine existence of overlap of each object with all other objects becomes very time consuming. An object by object approach is not feasible since it would involve the repeated tracking of each object's edges as it is compared with all the other objects in a page.

Figure 2:
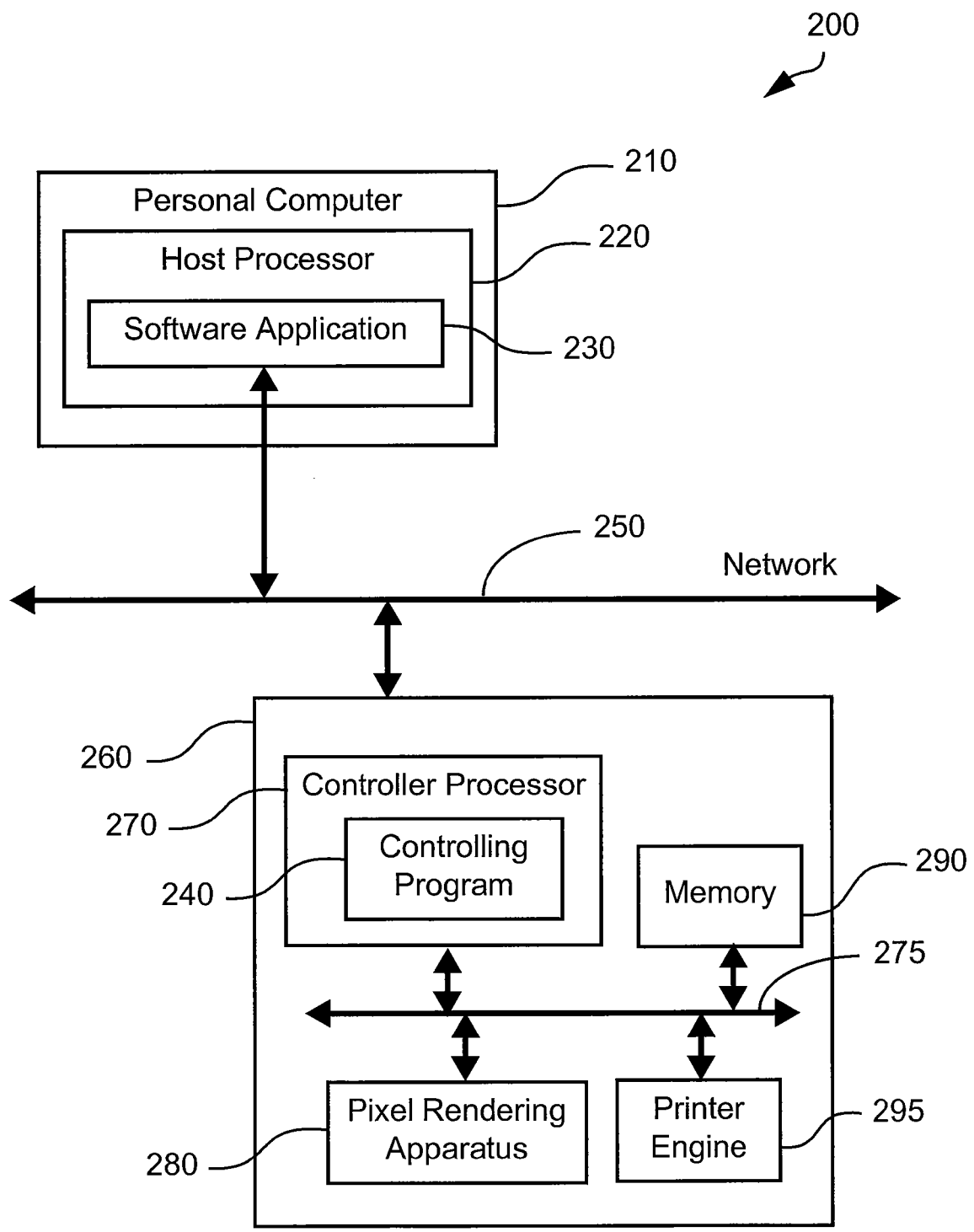

FIG. 2 shows a schematic block diagram of another prior art pixel rendering system 200. The pixel rendering system 200 also comprises a personal computer 210 connected to a printer system 260 through a network 250. The personal computer 210 comprises a host processor 220 for executing a software application 230. The printer system 260 comprises a controller processor 270, memory 290, a pixel rendering apparatus 280, and a printer engine 295 coupled via a bus 275. A controlling program 240 executes on the controller processor 270.

Hence, the pixel rendering system 200 differs from the system 100 shown in FIG. 1 in that the controlling program 240 executes on the controller processor 270 of the printer system 260, instead of on the host processor 220, as is the case in system 100. In system 200 the software application 230 sends a high level description of the page (for example a PDL file) to the controlling program 240 executing in the controller processor 270 of the printer system 260. The controlling program 240 performs the same task as its equivalent controlling program 140 in the system 100 shown in FIG. 1. In system 200 the load on the printer system 260 is much greater than the printer system 160 of the system 100.

Figure 3:
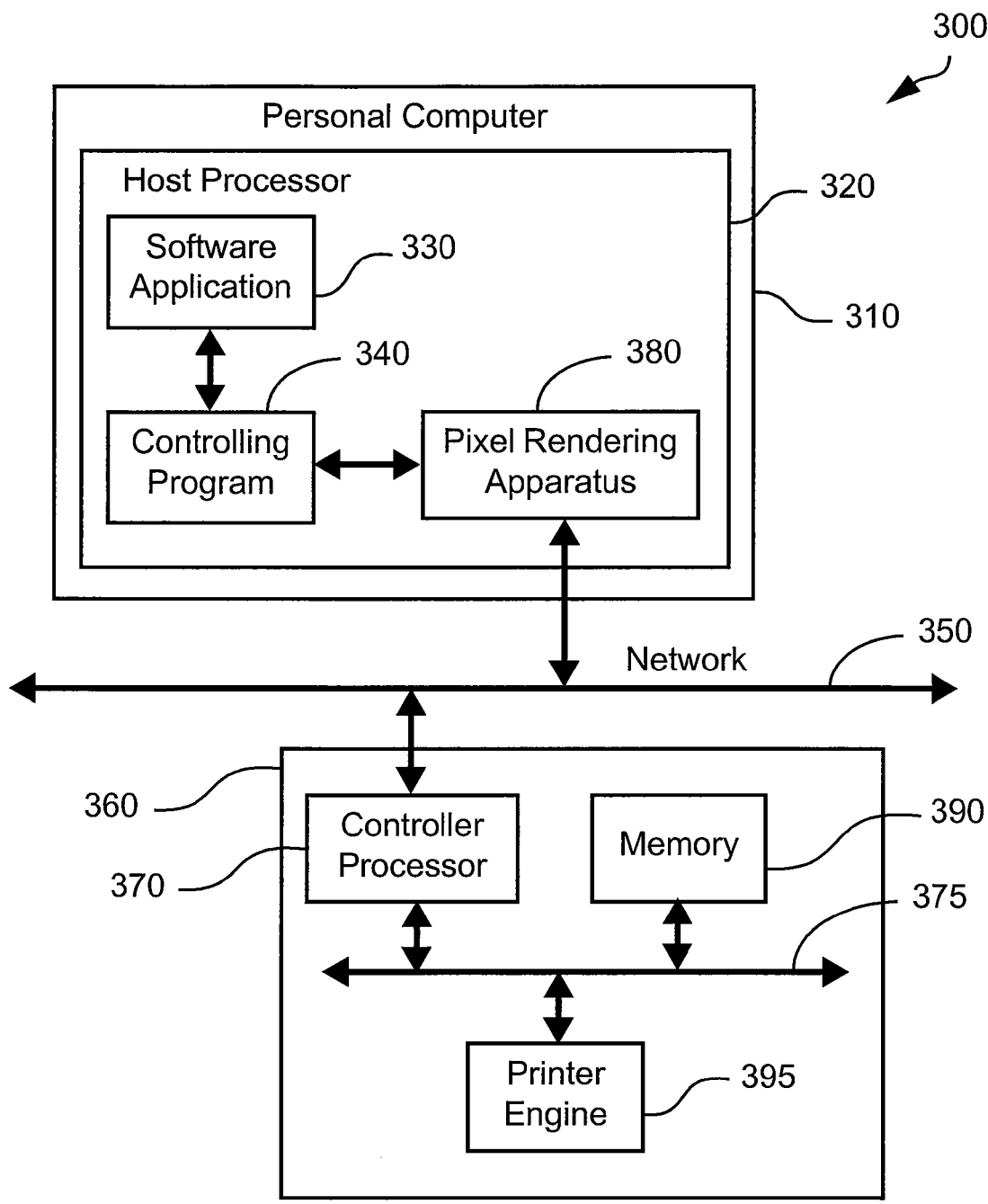

FIG. 3 shows a schematic block diagram of yet another prior art pixel rendering system 300. The pixel rendering system 300 also comprises a personal computer 310 connected to a printer system 360 through a network 350. The personal computer 310 comprises a host processor 320 for executing a software application 330, a controlling program 340, and a pixel rendering apparatus 380. The pixel rendering apparatus 380 is typically implemented in software executing on the host processor 320, but may also take the form of an ASIC chip executing as a co-processor to the host processor 320. The printer system 360 comprises a controller processor 370, memory 390, and a printer engine 395 coupled via a bus 375. In system 300 the controlling program 340 and the pixel rendering apparatus 380 combine to generate pixels that are delivered to the printer system 360 over the network 350.

The printer system 360 of the host-based printer system 300 may therefore be a candidate for a low-cost printer since it does not implement compositing in the printer system 360, instead requiring that the personal computer 310 implement this function. In the host-based pixel rendering system 300 the page to be printed is rasterised to a bitmap and compressed in the host processor 320 and shipped to the printer system 360 across the network 350.

In the host-based pixel rendering system 300 the main factor that needs to be considered in ensuring that the printer system 360 can maintain real-time printing is the time taken by the controller processor 370 to decompress the compressed bitmap that has been received from the host processor 320 and stored in the memory 390 of the printer system 360. If the bitmap decompression software can run fast enough in the controller processor 370 to ensure that the decompressed pixels are always available to the printer engine 395 when needed, then the printer system 360 is said to be able to print in real time.

Some remedial action may be taken in the overall host-based pixel rendering system 300 to ensure that real-time printing is guaranteed. For example, the resolution of the rasterised bitmap can be reduced for particularly complicated bitmaps that would otherwise not be possible to decompress in real-time in the printer system 360. This resolution reduction has the net effect of reducing the amount of data that needs to be handled by the bitmap decompression software running in the controller processor 370 with a resulting speed up in the rate of pixel generation. Reducing printer resolution reduces the quality of the printed image, a trade-off that must be considered when designing the printer.

Another method of guaranteeing real-time printing is to reduce the speed of the printer rollers. This has the net effect of reducing the rate of pixel consumption by the printer engine 395. The bitmap decompression software running in the printer system 360 can then take more time to decompress while still meeting the real-time deadline of the printer engine 395. While the quality of the page remains unaffected by this action, the printer's slowdown may not be desirable to the user.

In some existing networked host-based printers the controller processor 370 does not start decompressing pixels until such time as the all the compressed pixel data has been received into the printer system 360 over the network 350. The reason for this is to ensure that network latency does not affect the real-time printing guarantee of the printer system 360. If pixel shipping to the printer engine 395 were to commence before the full compressed bitmap were received, then there is the possibility that the network 350 would fail before the full page were received. In this case the printer engine 395 would be starved of data and only a part of the page would be printed. Since the rollers cannot be stopped in laser beam printers once a page has begun to print, the page would be ejected only partially printed.

In choosing to postpone decompression of the compressed bitmap in the printer system 360 until such time as the complete compressed image is received from the host processor 320 over the network 350 the printer system 360 must be designed with enough memory 390 to contain the worst case compressed image size possible. The worst case compressed page size is specified and controlled by the controlling program 340 running in the host processor 320. Lossy compression, resolution reduction and other techniques may be implemented to ensure the worst case page will, when compressed, fit in the memory 390.

In addition, it is desirable that the size of the compressed pixel data be small in order to avoid creating a bottleneck in the network 350. This bottleneck is undesirable because it would adversely affect the overall response time of the network 350 for other users of the network 350 but also because it increases the overall print time as defined as the time between the moment the user commands a page print and the printed page actually is ejected from the printer system 360.

The greatest advantage that the host-based pixel rendering system 300 has over the printer systems 100 and 200 is printer cost because it does not need to implement the time consuming and resource hungry tasks of PDL interpretation, edge tracking, object compositing, colour space conversion and halftoning in the printer itself. However as page resolutions and increased page printing rates are demanded in the future its design places too great a burden both on the network bandwidth and memory requirements necessary to implement a feasible solution.

Thus far, two contrasting printing architectures have been outlined. However, a third form exists whereby an intermediate display list (IDL) is generated on the host and then delivered to the printer. This IDL is, in general, bigger than the corresponding PDL format for the same page but in general is smaller than the typically compressed pixels for that page. By designing the format of the IDL appropriately, the complexity of the printer can be tuned for an optimum cost/performance trade-off in the overall printing system.

An IDL typically describes the objects on a page in terms of each object's boundary and other attributes of that object such as fill-type that describes the colour or colours of the pixels within the object, the relative viewing position of the object and how the object's colours should be combined with the colours of other objects that overlap it.

The printer designed to work with an IDL must contain such software and/or hardware resources on board to allow the decoding of the IDL and the generation of the rasterised pixel data that corresponds to the page. Since an IDL is generally significantly less complex than a full PDL, the resources needed in an IDL-based printer are consequently less than for the PDL equivalent printer. So, in general, an IDL-based printer is generally cheaper than the PDL equivalent printer.

Such an IDL approach has some additional advantages over both the PDL-based and host-based printer systems described above. Firstly, the flexibility in designing the format of an IDL means that computationally intensive tasks may be performed in that part of the printing system that is best suited to executing them. For example, a powerful host computer may be more suited to compositing pixels together rather than performing compositing in the printer itself. A flexible IDL format allows the system designer to balance the processing load between the printer and the host computer by dynamically shifting the processing load from host to printer or vice versa depending on the complexity of the page to be printed.

There are many technical challenges in designing a printer system that successfully balances the load between the host and the printer for a wide range of page types. It is of the utmost importance that printing quality and printing speed (page rate) are not compromised in the pursuit of the ideal balance between host and printer. Issues such as cost, quality, software and hardware reuse and immunity to increasing page resolution all need to be addressed in the design of the ideal load-balancing printer system.

Figure 6:
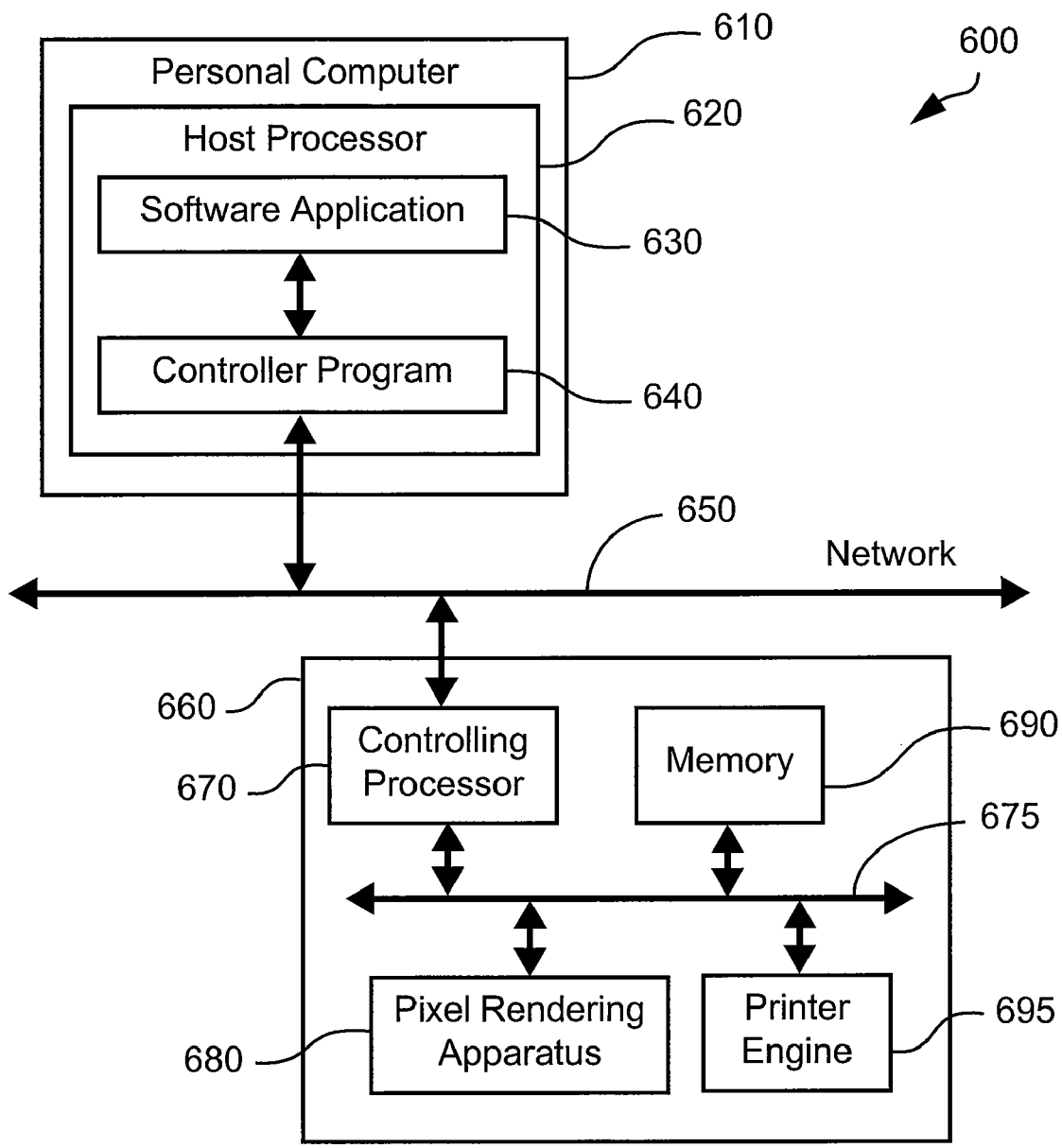
FIG. 6 shows a schematic block diagram of a pixel rendering system for rendering computer graphic object images according to the present invention.

FIG. 6 shows a schematic block diagram of a pixel rendering system 600 for rendering computer graphic object images in accordance with the present invention. The pixel rendering system 600 comprises a personal computer 610 connected to a printer system 660 through a network 650. The network 650 may be a typical network involving multiple personal computers, or may be a simple connection between a single personal computer and printer system 660.

The personal computer 610 comprises a host processor 620 for executing a software application 630, such as a word processor or graphical software application, and a controlling program 640 in the form of a driver on a Windows™ or Macintosh™ operating system.

The printer system 660 comprises a controller processor 670, memory 690, a pixel rendering apparatus 680, and a printer engine 695 coupled via a bus 675. The pixel rendering apparatus 680 is in the form of an ASIC card coupled via the bus 675 to the controller processor 670, and the printer engine 695. However, the pixel rendering apparatus 680 may also be implemented in software executed in the controller processor 670.

In the pixel rendering system 600, the software application 630 creates page-based documents where each page contains objects such as text, lines, fill regions, and image data. The software application 630 sends a page for printing, in the form of an application job, via a graphics application layer to the controlling program 640. In particular, the software application 630 calls sub-routines in a graphics application layer, such as GDI in Windows™, or X-11 in Unix™, which provide descriptions of the objects to be rendered onto the page, as opposed to a raster image to be printed.

The controlling program 640 receives the graphical objects from the application program 630, and decomposes the graphical objects into edges, levels and fills in the same manner as the controlling program 140 of the prior art pixel rendering system 100 (FIG. 1). These edges, levels and fills are called the first set of primitives. The fill may be a flat fill representing a single colour, a blend representing a linearly varying colour, a bitmap image or a tiled (i.e. repeated) image.

The controlling program 640 then further processes this first set of primitives to generate a second set of primitives that facilitates more flexibility in load balancing between the personal computer 610 and printer system 660.

Finally, an instruction job for forwarding to the controlling processor 670 is constructed using the second set of primitives.

The instruction job is then transferred for printing, via the network 650, to the controller processor 670, which controls the pixel rendering apparatus 680. In particular, a program executing on the controller processor 670 is responsible for receiving instruction jobs from the controlling program 640, providing memory 690 for the pixel rendering apparatus 680, initialising the pixel rendering apparatus 680, supplying the pixel rendering apparatus 680 with the start location in memory 690 of the job, and instructing the pixel rendering apparatus 680 to start rendering the job.

The pixel rendering apparatus 680 then interprets the instructions and data in the instruction job, and renders the page without further interaction from the controlling program 640. The output of the pixel rendering apparatus 680 is colour pixel data, which may be used by the output stage of the printer engine 695.

Whilst object based descriptions are generally used to describe the content of a page to be printed, this choice does not always provide the flexibility to implement optimisations such as removing redundant information from a display list. A typical driver as found in the prior art personal computer 110 decomposes the objects one by one into primitives that, in the main, represent only that object. Certain optimisations are possible, for example the reuse of similar shapes and fill data for the objects but this is often not very significant.

Therefore, instead of using an object based description for the page, the pixel rendering system 600 uses the edges of objects as the basis for describing the page. One approach uses the concept of an edge behaviour table. The edge behaviour table specifies attributes associated with an edge.

In particular, the edge behaviour table contains one or more entries, each entry containing one or more attributes of the edge to which the entry belongs and also a lifetime for which the attribute or attributes for the edge are active. Table 4 shows an edge behaviour table that has N entries, where each entry has P attributes.

TABLE 4

Layout of preferred implementation of an Edge Behaviour Table

| Lifetime | Attribute1 | Attribute2 | ... | Attribute P |
|---|---|---|---|---|
| $Lifetime_1$ | $Value_{11}$ | $Value_{12}$ | ... | $Value_{1P}$ |
| $Lifetime_2$ | $Value_{21}$ | $Value_{22}$ | ... | $Value_{2P}$ |
| ... | ... | ... | ... | ... |
| $Lifetime_N$ | $Value_{N1}$ | $Value_{N2}$ | ... | $Value_{NP}$ |

An attribute of an edge is data that is related to that edge. It may be a reference to data used to calculate the pixels following the edge on the page or it may be a function that is used to update the (x, y) position of the edge from scanline to scanline. The attribute may, in fact, be any data that is relevant to the edge.

While not all possibilities for the attribute of an edge are explicitly described, one skilled in the art may derive other attributes that are related to an edge as part of a page description used to render a page.

Each edge's attribute also has a lifetime, which is typically expressed in scanlines. So, for example, the attributes in one entry of an edge's edge behaviour table that are valid for 25 scanlines would have a lifetime field that indicates this. Depending on the most optimal solution for the hardware or software platform on which the pixel rendering apparatus 680 is implemented, the representation of the lifetime of 25 scanlines may be in relative or absolute terms.

In the case of an absolute representation of the lifetime of an edge behaviour table entry, the lifetime is expressed as "from scanline M to scanline N inclusive", where M is the first scanline for which the entry's attributes are valid and N is the last scanline for which the entry's attributes are valid, each scanline value being offset from the start of the page.

In the case of a relative representation of the lifetime of an edge behaviour table entry, the lifetime would be expressed as "25 scanlines". Implied in this representation is that the entry's attributes are valid for 25 scanlines from the start of the edge.

Other expressions are also possible for the lifetime field of each entry in an edge behaviour table. For example an entry that means "for the remainder of the edge" may be used to imply that the corresponding attributes are valid for the remainder of the edge.

While not explicitly mentioned here, those skilled in the art would appreciate that other expressions may be used to code in the lifetime of an edge.

Another approach that may be used to replace an object based display list is one where each original edge on the page is split, if necessary, into separate edges where each separate edge extends over successive scanlines as indicated by a single entry in the edge behaviour table that would be constructed for the original edge. Each separate edge references the same (set of) attribute(s) over its whole extent. In order to calculate the points at which the original edge should be split the original edge is tracked and when the attribute(s) of the original edge change, a new separate edge is started at that location and the existing separate edge (if any) is terminated. Note that the resolution of the start/end points of the separate edges must be such that the edge tracking of the separate edges is identical to that of the original edge. This embodiment does not require an edge behaviour table or lifetime data.

Figure 7:
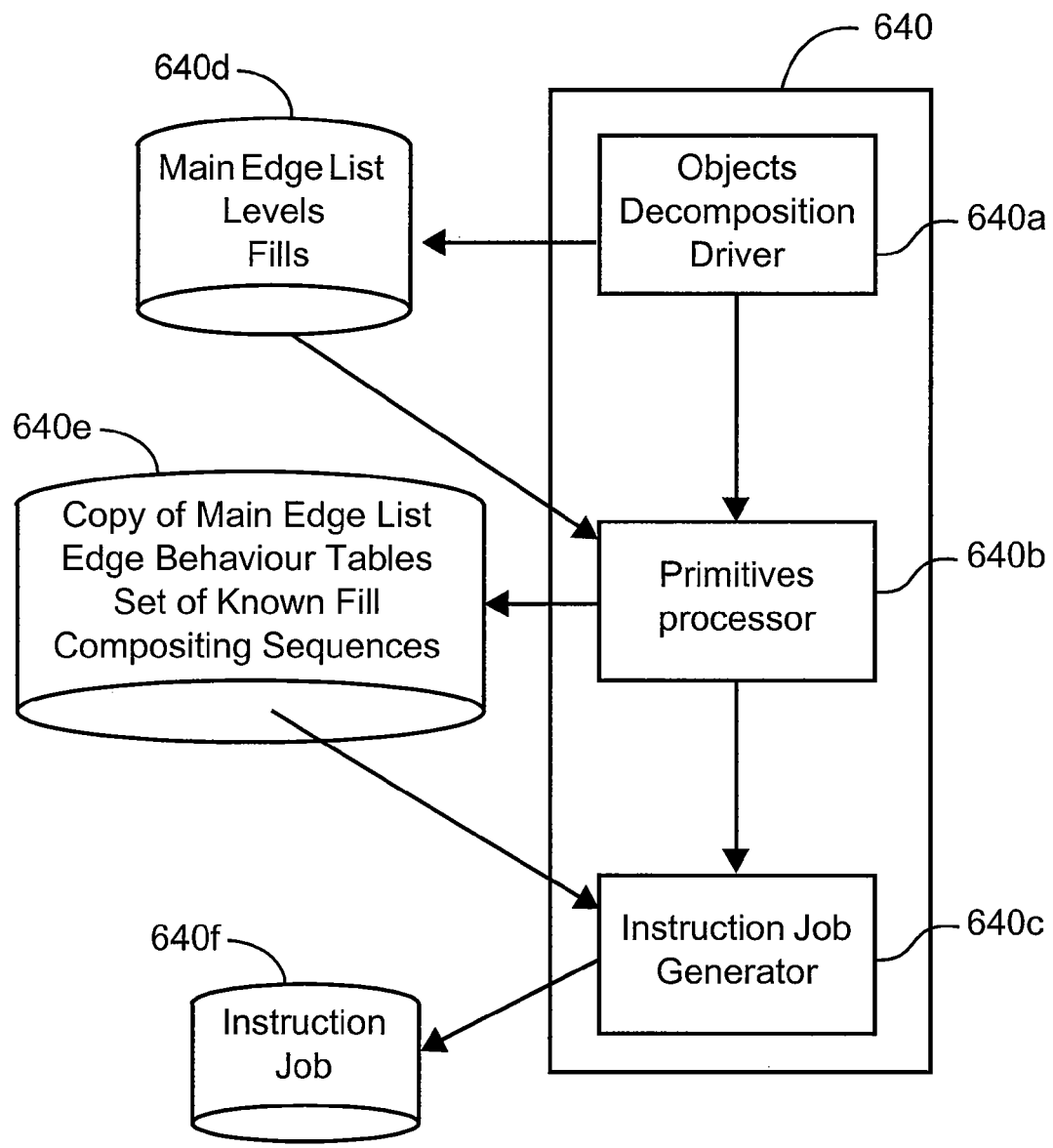
FIG. 7 illustrates the functional blocks of a controlling program in the pixel rendering system shown in FIG. 6.

Referring again to the pixel rendering system 600 in FIG. 6, the graphical objects on a page to be printed are passed from the software application 630 to be processed by the controlling program 640. The role of the controlling program is to generate a display list that can be rendered by the pixel rendering apparatus 680. FIG. 7 shows a schematic block diagram of the controlling program 640 in more detail. The controlling program 640 comprises an objects decomposition driver 640a, a primitives processor 640b and an instruction job generator 640c.

The method employed by the controlling program 640 is to first decompose, using the objects decomposition driver 640a, the page objects passed from the software application 630 into a representation of edges, levels and fills. As noted above, these edges, levels and fills are called the first set of primitives, and are stored in store 640d. Within the primitives processor 640b, the first set of primitives in store 640d is further processed to generate a second set of primitives placed in store 640e. The second set of primitives includes edges, an edge behaviour table for every edge and a known fill compositing sequence table. The second set of primitives in store 640e is then further processed by the instruction job generator 640c which creates a display list that can be rendered by the pixel rendering apparatus 680.

Figure 8:
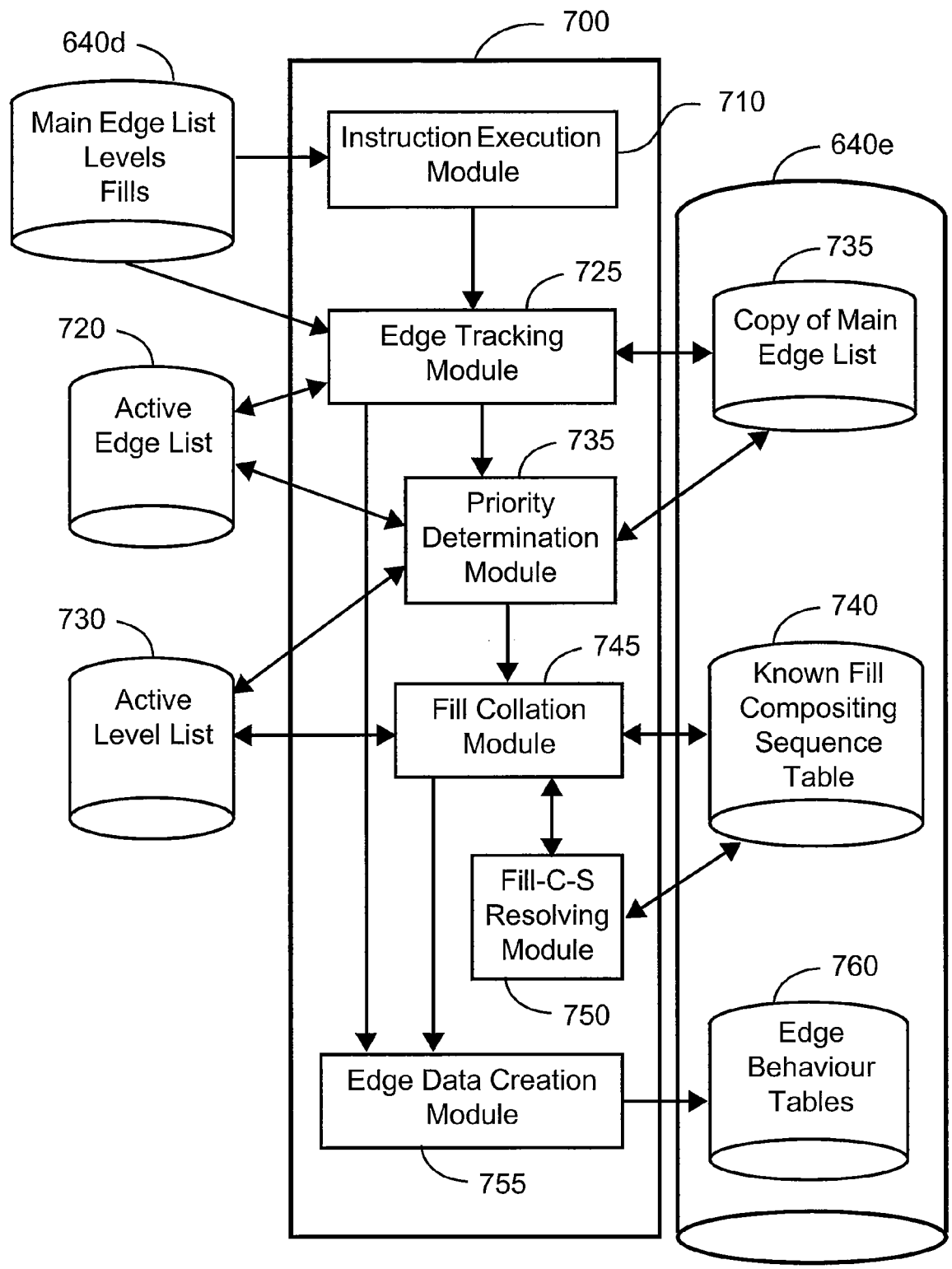
FIG. 8 shows a schematic block diagram of a pre-processing module forming an aspect of a primitives processor shown in FIG. 7.

In the preferred implementation the primitives processor 640b includes a pre-processing module 700, a schematic block diagram of which is shown in FIG. 8. The pre-processing module 700 comprises an instruction execution module 710; an edge tracking module 725; a priority determination module 735; a fill collation module 745; a fill compositing sequence resolving module 750 and an edge data creation module 755.

The instruction execution module 710 reads and processes instructions from the first set of primitives 640d and formats the instructions into messages that are transferred to the other modules within the pre-processing module 700. The edge tracking module 725 is responsible for determining the edge that bounds the span of the currently scanned pixels using the active edge list 720 that the edge tracking module 725 maintains, and passes this information on to the priority determination module 735.

Figure 11A:
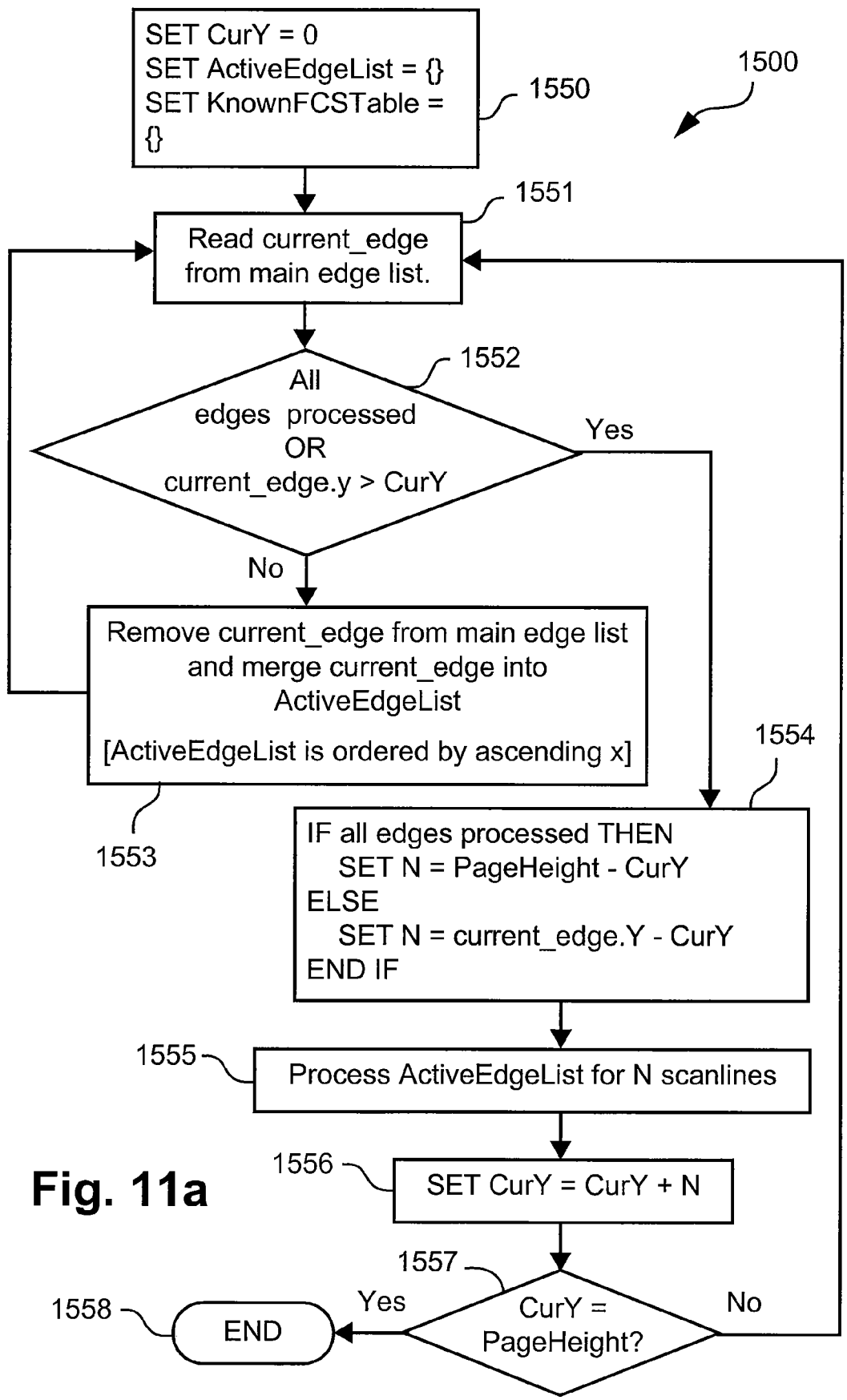
FIG. 11a shows a schematic flow diagram of a method of processing the edges on a scanline.

FIG. 11a shows a schematic flow diagram of a method 1500, performed by the edge tracking module 725, of processing the edges on a scanline. It is achieved by determining the active edges on each scanline, and from these active edges, determining the objects that contribute to each pixel on the scanline. The method 1500 determines the active edges on any scanline from the main edge list in the first set of primitives in store 640d. The main edge list contains all the edges to be rendered on the page, sorted in ascending order of their starting scanline (y-order), and the active edge list (ActiveEdgeList) 720 is a temporary list of edges that intersect the current scanline.

The method 1500 starts in step 1550 where a variable CurY is set to zero, and an active edge list 720 and a known fill compositing sequence table 740 are set to empty sets. A copy 735 is made of the main edge list for later inclusion in the second set of primitives 640e that will be used to construct the instruction job. Then, in step 1551, the edge tracking module 725 reads an edge from the main edge list in store 640d. The edge tracking module 725 next determines in step 1552 whether all the edges in the main edge list have been processed, or whether the y-value of the currently-read edge, having variable name current_edge.y, is greater than the value stored in the variable CurY. If neither of these conditions is satisfied then the method 1500 proceeds to step 1553 where the edge tracking module 725 removes the current edge from the main edge list. The current edge is also merged into the active edge list. Edges in the active edge list are ordered by ascending x-value; i.e. the order along the scanline. Once the current edge is merged into the active edge list the method 1500 returns to step 1551 where the next edge is read from the main edge list.

If it is determined in step 1552 that either of the conditions is satisfied, then in step 1554 the edge tracking module 725 determines a number N of scanlines to pre-render. If all the edges in the main edge list have been processed then the number N is set to the number of scanlines remaining on the page; i.e. the difference between the page height and the current scanline CurY as follows:

$$N = \text{PageHeight} - \text{Cur}Y \quad (1)$$

If, however, there are still edges in the main edge list to process, then the number N is set to the number of scanlines between the current scanline CurY and the scanline on which the currently-read edge commences:

$$N = \text{current\_edge}.y - \text{Cur}Y \quad (2)$$

Once the number N of scanlines has been determined in step 1554 the active edge list 720 for N scanlines is passed to the priority determination module 735 for processing in step 1555. The processing of the N scanlines in step 1555 is described in more detail with reference to FIG. 11b. The edge tracking module 725 then updates the current scanline CurY in step 1556 using the equation:

$$\text{Cur}Y = \text{Cur}Y + N \quad (3)$$

Next, in step 1557, the edge tracking module 725 determines whether the updated current scanline CurY is equal to the page height. If so, the method 1500 terminates in step 1558. Alternatively, if it is determined in step 1557 that the current scanline CurY is less than the page height then the method 1500 returns to step 1551 from where the next edge from the main edge list is processed.

Figure 11B:
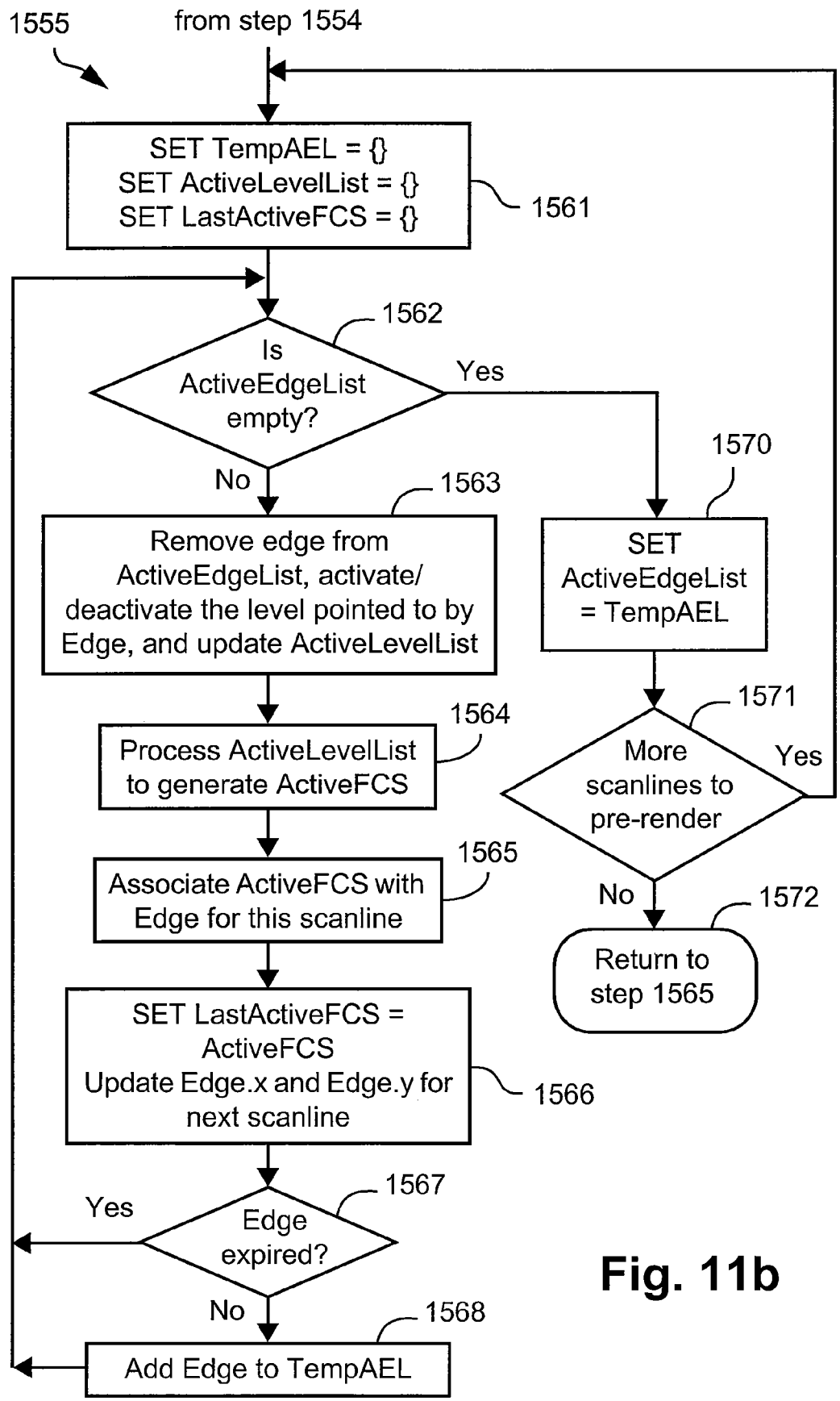
FIGS. 11b, 11c, 11d, and 11e show schematic flow diagrams of steps of the method shown in FIG. 11a in more detail.

Step 1555 of processing a scanline by the priority determination module 735 is now described in more detail with reference to FIG. 11b wherein a schematic flow diagram of step 1555 is shown. In particular, in step 1555 the active edge list 720 created by the edge tracking module 725 is used by the priority determination module 735 to update the set of active level information in the active level list 730. The step 1555 starts in an initialising sub-step 1561 wherein the priority determination module 735 sets a temporary active edge list (TempAEL) to an empty set and also sets the active level list (ActiveLevelList) 730 and a last active fill compositing sequence (LastActiveFCS) to empty sets. Sub-step 1562 follows where the priority determination module 735 determines whether the active edge list 730 is empty, hence whether all edges in the active edge list 730 have been processed.

If it is determined that the active edge list 730 still contains entries then step 1555 continues to sub-step 1563 where the next edge along the scanline is read from the active edge list 730 and that edge is removed from the active edge list 720. Also, the level or levels pointed to by that edge are activated or deactivated as appropriate. If a level or levels are activated they are added to the active level list 730. Otherwise if the level or levels are deactivated they are removed from the active level list 730.

Then, in sub-step 1564, the active level list 730 is further processed by the fill collation module 745 and fill compositing sequence resolving module 750 in order to generate a distinct active fill compositing sequence (ActiveFCS). Sub-step 1564 is described in more detail with reference to FIG. 11c. Sub-step 1565 follows sub-step 1564 where the generated active fill compositing sequence (ActiveFCS) is associated with the current edge on the present scanline by the edge data creation module 755. Sub-step 1565 is described in more detail with reference to FIG. 11e.

In step 1566 the active fill compositing sequence or its optimised equivalent (to be described later), if the latter is different from the active fill compositing sequence, is copied into the last active fill compositing sequence variable LastActiveFCS and the x-position of the edge (Edge.x) and the y-position of the edge (Edge.y) are updated for this edge for the next scanline.

In sub-step 1567 the priority determination module 735 then determines whether the edge expires, in other words, terminates. If the edge terminates then the step 1555 returns to sub-step 1562. Alternatively, if it is determined in sub-step 1567 that the edge does not terminate then that edge is sorted into the temporary active edge list based on the updated x-position in sub-step 1568 before the step 1555 returns to sub-step 1562.

From sub-step 1562 any subsequent edges on the scanline are processed until it is determined in sub-step 1562 that the active edge list is empty. Step 1555 then proceeds to sub-step 1570 where the temporary active edge list is copied into the active edge list. The priority determination module 735 then determines in sub-step 1571 whether more scanlines need to be processed. If not then the step 1555 returns in sub-step 1572 back to step 1556 in FIG. 11a. Alternatively, if it is determined that more scanlines have to be processed, then the step 1555 returns to sub-step 1561.

Sub-step 1564 of processing the active level list 730 by the fill collation module 745 and the fill compositing sequence resolving module 750 to calculate the active fill compositing sequence is now described in more detail with reference to FIG. 11c wherein a schematic flow diagram of sub-step 1564 is shown. Sub-step 1564 starts in sub-step 1580 where a variable Lvl is set to the value NULL. The fill collation module 745 then in sub-step 1581 determines whether the active level list 730 is empty. If the active level list 730 is determined to be empty then, in step 1582, the fill collation module 745 sets the active fill compositing sequence variable to WhiteBkGnd.

Alternatively, if it is determined in sub-step 1581 that the active level list 730 is not empty, the sub-step 1564 proceeds to sub-step 1584 where the active level list 730 is sorted by descending priority order such that the first level in the active level list 730 corresponds to the object that is closest to the viewer. The number of entries in the active level list is NumLevels. In sub-steps 1585, 1586, 1587 and 1588, the fill collation module 745 determines the highest level (Lvl) in the active level list 730 that is opaque when the objects are viewed from above. When such a level is found the fill collation module 745 copies that opaque level and any levels above it into the active fill compositing sequence variable in sub-step 1589.

From sub-step 1582 or 1589 processing continues to sub-step 1590 where the fill collation module 745 determines whether the active fill compositing sequence already exists in the set of known fill compositing sequences 740. If it is determined that the active fill compositing sequence already exists in the set of known fill compositing sequences 740 then sub-step 1564 returns in sub-step 1593 to sub-step 1565 in FIG. 11*b*.

Alternatively, if it is determined in sub-step 1590 that the active fill compositing sequence does not exist in the set of known fill compositing sequences 740, then the active fill compositing sequence is added to the set of known fill compositing sequences 740 in sub-step 1591. Then, in sub-step 1592, the active fill compositing sequence is further processed by the fill compositing sequence resolving module 750 before the sub-step 1564 ends in sub-step 1593 where a return is made to sub-step 1565 in FIG. 11*b*. Sub-step 1592 is described in more detail with reference to FIG. 11*d*.

Sub-step 1592 of processing the active fill compositing sequence performed within the fill compositing sequence resolving module 750 is now described in more detail with reference to FIG. 11*d* wherein a schematic flow diagram of sub-step 1592 is shown. Sub-step 1592 starts in sub-step 1542 where the fill compsting sequence resolving module 750 determines an optimised equivalent fill compositing sequence (OEFCS) for the active fill compositing sequence. For example, a fill compositing sequence consisting only of flat fills could be reduced on compositing to a single opaque flat fill, which would be the OEFCS. Alternatively, a fill compositing sequence may, on examination, contain a pair of levels that cancel each other out, i.e. contribute nothing to the pixel colour. In such a case the fill compositing sequence can be replaced by an equivalent fill compositing sequence that has such a pair of levels removed, without affecting the resultant output of the fill compositing sequence. In a further alternative, two or more sequential flat fills above the highest priority non-flat (i.e. bitmap or blend) fill in the fill compositing sequence can be composited to form a single flat fill which replaces the two or more flat fills to form the optimised equivalent fill compositing sequence. In all cases, the optimised equivalent fill compositing sequence has fewer compositing operations than the fill compositing sequence.

Next, processing in sub-step 1592 proceeds to sub-step 1543 where it is determined whether the optimised equivalent fill compositing sequence calculated in sub-step 1542 (the current optimised equivalent fill compositing sequence) is different from the active fill compositing sequence. If it is determined that the current optimised equivalent fill compositing sequence is different to the active fill compositing sequence then, in sub-step 1544, the set of known fill compositing sequences 740 is searched for an optimised equivalent fill compositing sequence that is the same as the current optimised equivalent fill compositing sequence.

The fill compsting sequence resolving module 750 next determines in sub-step 1545 whether the optimised equivalent fill compositing sequence was found among the set of known fill compositing sequences 740. If the optimised equivalent fill compositing sequence was not found, processing proceeds to sub-step 1546, where the current optimised equivalent fill compositing sequence is added to the known fill compositing sequence table 740. In addition, the reference of the just-added optimised equivalent fill compositing sequence is set to NULL to indicate that the optimised equivalent fill compositing sequence does not have a different optimised equivalent fill compositing sequence associated with it.

From sub-step 1546, or if it is determined in sub-step 1545 that the optimised equivalent fill compositing sequence was found among the set of known fill compositing sequences 740, in sub-step 1547 that follows the optimised equivalent fill compositing sequence is grouped together with the active fill compositing sequence in the table of known fill compositing sequences. This is done by adding a reference to the optimised equivalent fill compositing sequence (whether newly added in step 1546 or already present) in the OEFCS-Ref field of the active fill compositing sequence's entry in the set of known fill compositing sequences 740.

Following sub-steps 1547 or 1549, in sub-step 1547*a* a hidden flag variable is set to be TRUE if the fill compositing sequence corresponding to the span before the current edge (stored in variable LastActiveFCS) is the same as the active fill compositing sequence, or its optimised equivalent referenced by the OEFCSRef field if that field is non-null. The hidden flag variable is otherwise set to be FALSE.

Figure 11C:
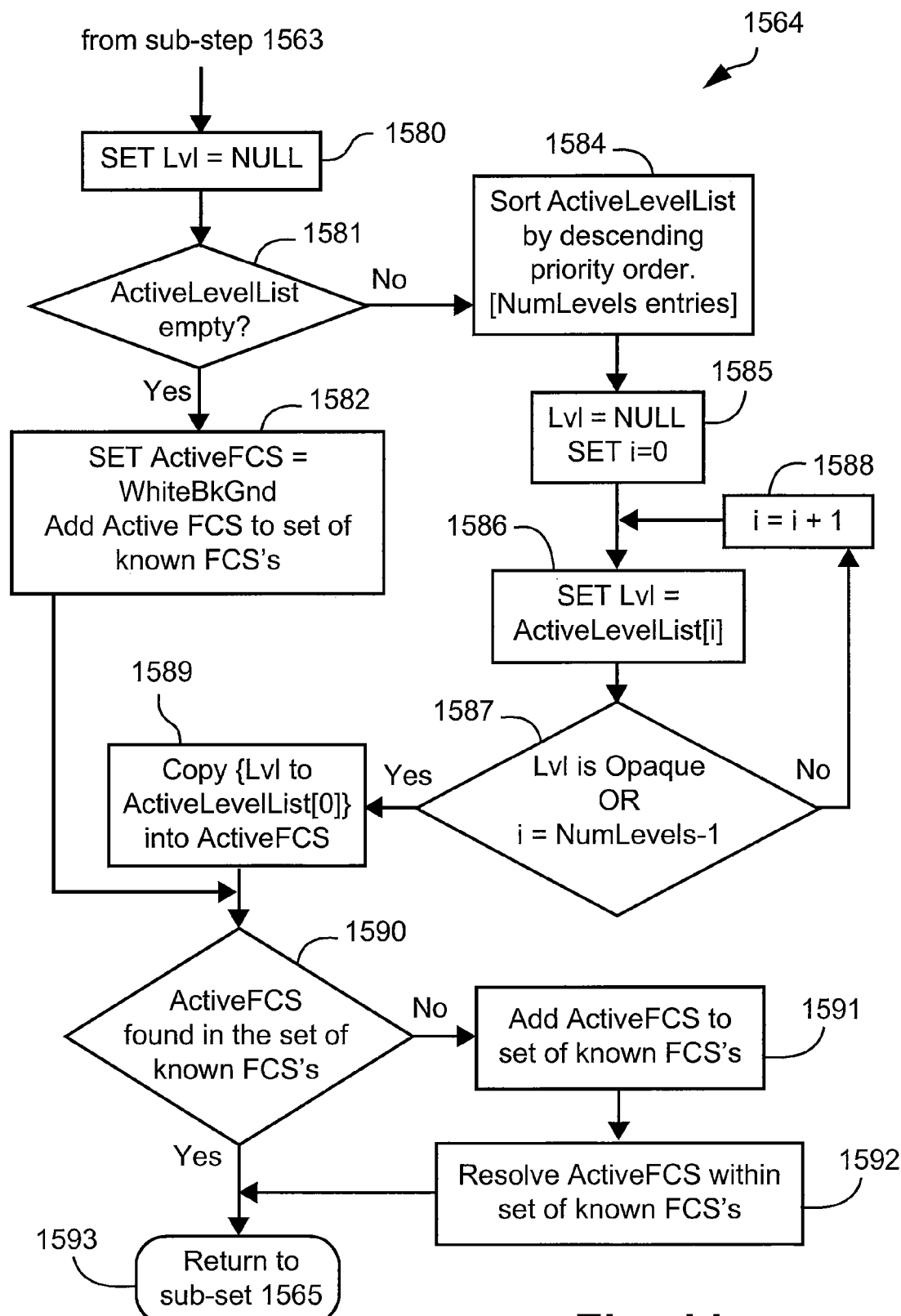
Figure 11D:
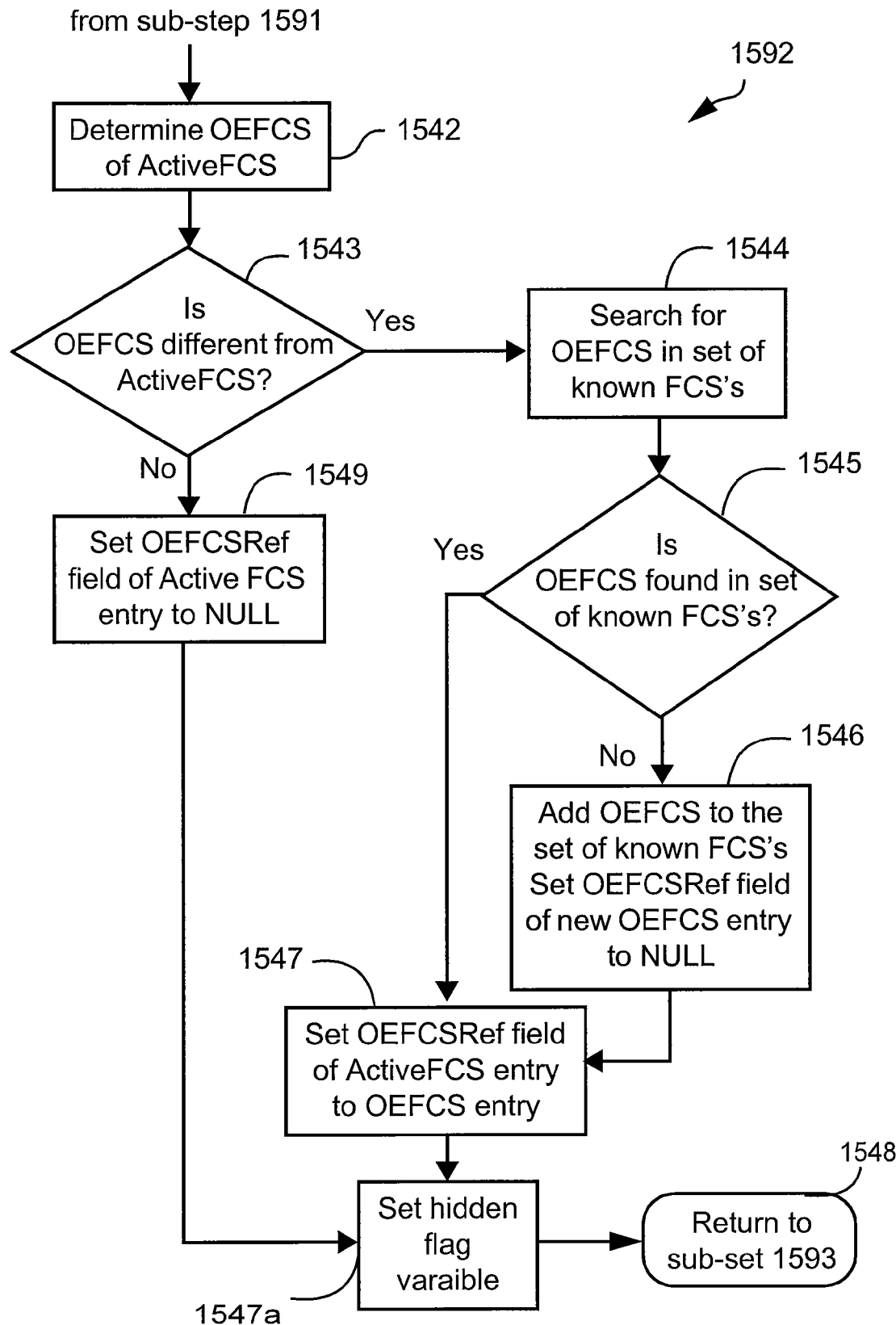

Sub-step 1592 then ends in sub-step 1548 by returning control to sub-step 1593 in FIG. 11*c*.

In a variation of sub-step 1545, the test can be whether a fill compositing sequence that is visually equivalent to, rather than the same as, the optimised equivalent fill compositing sequence is present in the set of known fill compositing sequences 740. A fill compositing sequence that is a first flat colour is considered visually equivalent to another fill compositing sequence that is a second flat colour where the difference between the first and second flat colours is within a predetermined threshold related to human colour perception. Other methods of establishing visual equivalence between fill compositing sequences are known to those skilled in the art.

Referring again to sub-step 1543, if it is determined that the two fill compositing sequences are the same, then in sub-step 1549 the reference of the active fill compositing sequence is set to NULL to indicate that the active fill compositing sequence has no distinct optimised fill compositing sequence associated with it before sub-step 1592 returns in sub-step 1548.

Figure 11E:
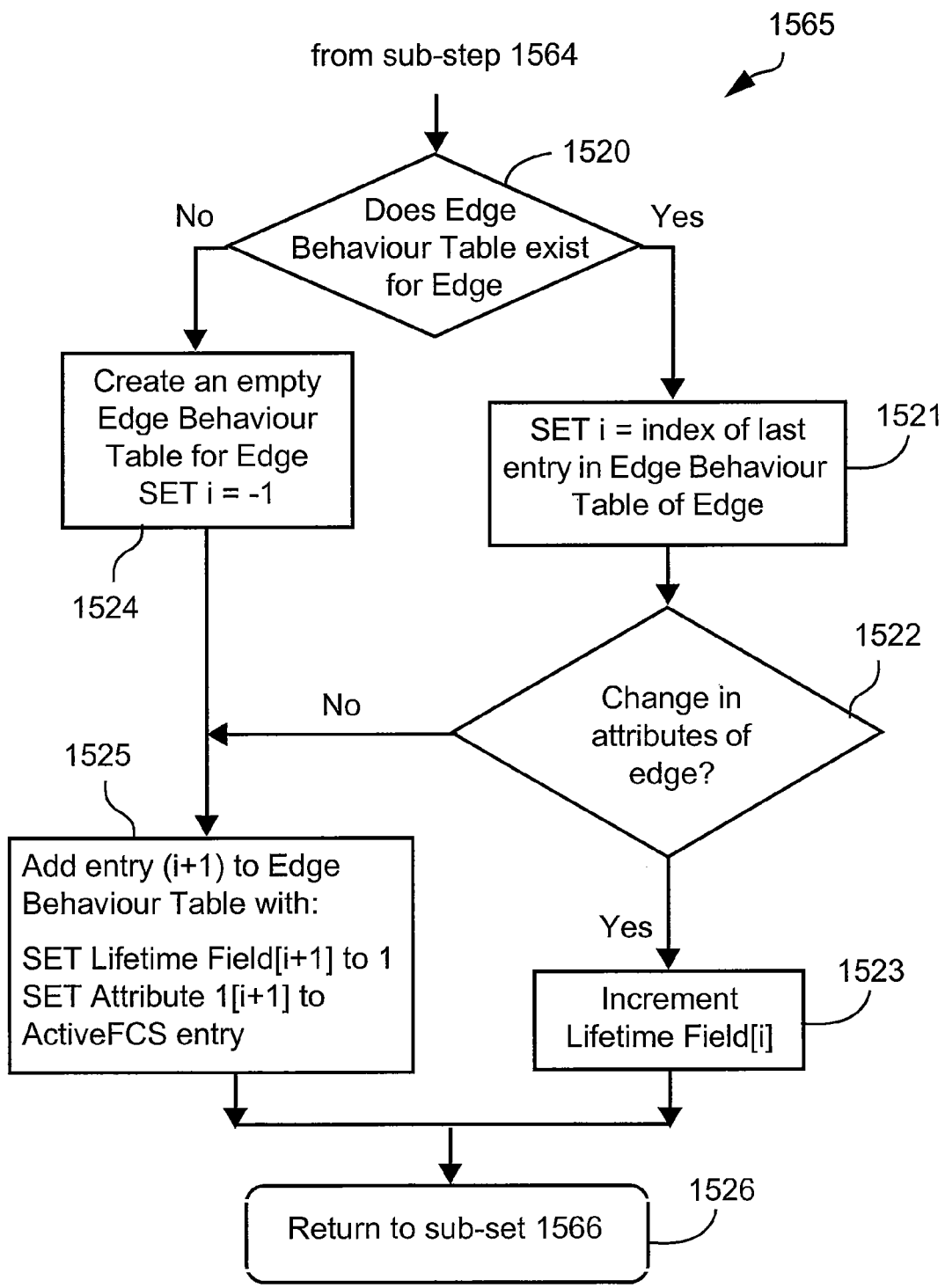

Sub-step 1565 in FIG. 11*b* of associating the active fill compositing sequence with the current edge is now described in more detail with reference to FIG. 11*e* wherein a schematic flow diagram of sub-step 1565 is shown.

In one implementation each edge has an edge behaviour table that contains two attributes. The first attribute is a reference to the active fill compositing sequence entry in the set of known fill compositing sequences 740. The second attribute is a hidden flag that indicates that an edge does not change the aggregate fill table entry that is active before the edge. In this sense the edge is hidden. Table 5 shows an implementation of an edge behaviour table. The contents of the edge behaviour table may include other attributes.

TABLE 5

| | Edge Behaviour Table | |
|---|---|---|
| Lifetime | Attribute 1 (FCS index) | Attribute 2 (hidden flag) |
| Lifetime$_1$ | FCS index$_i$ | TRUE/FALSE |
| Lifetime$_2$ | FCS index$_k$ | TRUE/FALSE |
| Lifetime$_3$ | FCS index$_l$ | TRUE/FALSE |
| ... | ... | |
| For the remainder of the edge | FCS index$_z$ | TRUE/FALSE |

Sub-step 1565 starts in sub-step 1520 where the edge data creation module 755 determines whether an edge behaviour table for the edge under consideration exists in the set of edge behaviour tables 760. In the case where such an edge behaviour table does not exist, one is created and added to the set of edge behaviour tables 760 in sub-step 1524 and a variable i is set to −1. In sub-step 1525 that follows sub-step 1524 an entry is added to the edge behaviour table at index i+1 (becoming index 0 or the first entry in this case). In sub-step 1525 the attribute is also set to be a reference to the active fill composting sequence for this edge within the set of known fill compositing sequences 740 on the current scanline, as determined in the sub-steps of FIG. 11c. Finally in sub-step 1525 the lifetime field of the just-added edge behaviour table entry is initialised to 1. Sub-step 1565 then returns in sub-step 1526 to sub-step 1566 in FIG. 11b.

If it is determined in sub-step 1520 that an edge behaviour table for the edge under consideration already exists in the set of edge behaviour tables 760 then, in sub-step 1521, the variable i is set to be the index of the last entry in the edge's edge behaviour table. The edge data creation module 755 then determines in sub-step 1522 whether there has been any change from the previous scanline in the attributes of this edge: the active fill compositing sequence (Attribute 1), and the hidden flag (Attribute 2). If it is determined that there have been no changes then the lifetime field of this entry is incremented in sub-step 1523 before sub-step 1565 returns in sub-step 1526.

Alternatively, if it is determined in sub-step 1522 that there has been a change from the previous scanline in the attributes of this edge then sub-step 1565 proceeds to sub-step 1525 where a new entry is added to the edge behaviour table that contains as Attribute 1 a reference to the new fill compositing sequence and as Attribute 2 the value of the hidden flag. The lifetime field of the just-added edge behaviour table entry is also initialised to 1, before sub-step 1565 returns in sub-step 1526.

In this manner, when all the edges have been tracked down the page by the pre-processing module 700, the set of known fill compositing sequences 740 contains an entry for each unique combination of levels (and, by reference, the fills associated with these levels) that has been encountered on the page. Also, there is a grouping between equivalent fill compositing sequences within the set of known fill compositing sequences 740.

In addition, an edge behaviour table has been created for each edge and these tables are populated with an attribute that indicates which fill compositing sequence is active for every edge on each scanline. These edge behaviour tables are collected in the set of edge behaviour tables 760. It is then the role of the instruction job generator 640c (FIG. 7) to generate an instruction job 640f from the copy 735 of the edges in the main list, the set of known fill compositing sequences 740 and the set of edge behaviour tables 760. The instruction job 640f contains all the edges on the page, the associated edge behaviour tables and a table of fills as referenced by the edge behaviour table entries.

The table of fills contains a plurality of fills. Each fill contains sufficient data to allow the printer system 660 to determine the colour of a pixel in any region of the page. The table of fills is derived from the set of known fill compositing sequences 740 as created by the pre-processing module 700 (FIG. 8).

In the case where a fill compositing sequence in the set of known fill compositing sequences 740 has a corresponding optimised fill compositing sequence in the set of known fill compositing sequences 740, the instruction job generator 640c chooses the optimised equivalent fill compositing sequence when generating a corresponding fill in the instruction job 640f. Otherwise, indicated by a NULL entry in the OEFCSRef column of the fill compositing sequence table, the instruction job generator 640c chooses the fill compositing sequence itself when generating a corresponding fill in the instruction job 640f.

In the case where the result of compositing a fill compositing sequence is a flat colour, then the resultant flat colour is the optimised equivalent fill compositing sequence corresponding to the fill compositing sequence. However, an optimised equivalent fill compositing sequence will, in many cases, not be a flat colour, but will consist of one or more levels that correspond to bitmap objects, graphic objects (such as blends) and flat colours. The instruction job generator 640c may, depending on the capabilities of the printer system 660, actually composite the contributing levels within such an optimised equivalent fill compositing sequence such that an opaque fill is created. In this way the printer need not perform compositing. In the case where the printer is designed to implement compositing, then the instruction job generator 640c has the option to retain the original levels of the optimised equivalent fill compositing sequence and encode them into a fill within the instruction job 640f, thus leaving the compositing of these levels together as a task for the printer.

Finally, the instruction job 640f that is generated by the instruction job generator 640c is transferred by the controlling program 640 to the printer system 660 where it is rendered to pixels. More particularly, the instruction job is transferred to the controlling processor 670 of the printer system 660. The controlling processor 670 initialises the pixel rendering apparatus 680, supplies the starting location of the instruction job 640f, and instructs the pixel rendering apparatus 680 to render the job.

The operations performed by the pre-processing module 700 are now further described by way of example. In a first example the use of equivalent fill compositing sequence regions are described with reference to FIG. 9 wherein a page 900, containing 3 rectangles 901, 902 and 903, is shown. The rectangle 901 is filled with Fill A, rectangle 902 is filled with Fill B, and rectangle 903 is filled with Fill A.

Fill A is a fill consisting of a flat colour with 50% transparency. Fill B is a fill of a different flat colour, again with 50% transparency. The two regions marked 'C' are filled with the result of compositing fill B over fill A. The background of the page 900 is white.

The edges in the page description are traversed in pixel sequential order. On scanline 910 edge 970 is crossed, and fill A is enabled. At this point, the known fill compositing sequence table 740 is searched for a fill compositing sequence entry (A+W) representing the combination of fill A with the white background.

Since this is the first time this fill compositing sequence has been encountered it is not found. The fill compositing sequence (A+W) is therefore added to the known fill compositing sequence table 740.

The set of known fill compositing sequences 740 therefore becomes:

TABLE 6

Set of known fill compositing sequences 740

| Entry | Fill Compositing Sequence | Reference to OEFCS (OEFCSRef) |
|---|---|---|
| 0 | A + W | — |

The fill compositing sequence (A+W) is passed to the fill compositing sequence resolving module 750 for analysis. Fill A is a semi-transparent flat colour so the fill compositing sequence resolving module 750 determines that an optimised equivalent fill compositing sequence for (A+W) is the flat colour that results from compositing the transparent colour of fill A with the white background. The resultant colour is $A_W$.

The fill compositing sequence resolving module 750 searches the known fill compositing sequence table 740 to see if the resulting flat colour $A_W$ has been generated elsewhere on the page. It has not, so the flat colour $A_W$ is added to the known fill compositing sequence table 740 as a new fill compositing sequence and both said new fill compositing sequence ($A_W$) and fill compositing sequence (A+W) are grouped together to mark them as equivalent.

The set of known fill compositing sequences 740 therefore becomes:

TABLE 7

Set of known fill compositing sequences 740

| Entry | Fill Compositing Sequence | Reference to OEFCS (OEFCSRef) |
|---|---|---|
| 0 | A + W | 1 |
| 1 | $A_W$ | NULL |

The fill compositing sequence (A+W) is associated with edge 970 by adding an entry in the edge behaviour table of edge 970 that references fill compositing sequence (A+W).

Pre-processing of scanline 910 continues with consideration of edge 975, which deactivates fill A. At this point, the known fill compositing sequence table 740 is searched for a fill compositing sequence entry (WhiteBkGnd) representing no levels being active. Since this is the first time this fill compositing sequence has been encountered it is not found. The fill compositing sequence (WhiteBkGnd) is therefore added to the known fill compositing sequence table 740. The fill compositing sequence 'WhiteBkGnd' passed to the fill compositing sequence resolving module 750 for analysis. The fill compositing sequence resolving module 750 determines that the OEFCS for 'WhiteBkGnd' is also 'WhiteBkGnd'. The OEFCSRef entry is therefore set to NULL.

The set of known fill compositing sequences 740 therefore becomes:

TABLE 8

Set of known fill compositing sequences 740

| Entry | Fill Compositing Sequence | Reference to OEFCS (OEFCSRef) |
|---|---|---|
| 0 | A + W | 1 |
| 1 | $A_W$ | NULL |
| 2 | WhiteBkGnd | NULL |

The fill compositing sequence (WhiteBkGnd) is associated with edge 975 by adding an entry in the edge behaviour table of edge 975 that references the fill compositing sequence (WhiteBkGnd).

No fills are active for the rest of the scanline 910.

Pre-processing progresses in this way until scanline 920 is reached, where edge 980 becomes active. On scanline 920 fill B is activated as edge 980 is crossed. The resultant activated fill state (B+W) is encountered for the first time and added to the known fill compositing sequence table 740 in a manner similar to above so that the set of known fill compositing sequences 740 becomes:

TABLE 9

Set of known fill compositing sequences 740

| Entry | Fill Compositing Sequence | Reference to OEFCS (OEFCSRef) |
|---|---|---|
| 0 | A + W | 1 |
| 1 | $A_W$ | NULL |
| 2 | WhiteBkGnd | NULL |
| 3 | B + W | — |

The fill compositing sequence (B+W) is passed to the fill compositing sequence resolving module 750 for analysis. Fill B is a semi-transparent flat colour so the fill compositing sequence resolving module 750 determines that an optimised equivalent fill compositing sequence for (B+W) is the flat colour that results from compositing the transparent colour of fill B with the white background. The resultant colour is $B_W$.

The fill compositing sequence resolving module 750 searches the known fill compositing sequence table 740 to see if the resulting flat colour $B_W$ has been generated elsewhere on the page 900. As the resulting flat colour $B_W$ has not been generated elsewhere on the page 900 the flat colour $B_W$ is added to the known fill compositing sequence table 740 as a new fill compositing sequence and both said new fill compositing sequence $B_W$ and fill compositing sequence (B+W) are grouped together to mark them as equivalent.

The set of known fill compositing sequences 740 therefore becomes:

TABLE 10

Set of known fill compositing sequences 740

| Entry | Fill Compositing Sequence | Reference to OEFCS (OEFCSRef) |
|---|---|---|
| 0 | A + W | 1 |
| 1 | $A_W$ | NULL |
| 2 | WhiteBkGnd | NULL |
| 3 | B + W | 4 |
| 4 | $B_W$ | NULL |

The fill compositing sequence (B+W) is associated with edge 980 by adding an entry in the edge behaviour table of edge 980 that references fill compositing sequence (B+W).

Continuing across the scanline 920, edge 970 is crossed, and fill A is activated. The pixels between edge 970 and edge 985 use fill compositing sequence (A+B+W).

At this point, the known fill compositing sequence table 740 is searched for a fill compositing sequence entry (A+B+W), representing the combination of fill A, fill B, and the white background. Since the fill compositing sequence (A+B+W) has not previously been encountered, it is added to the set of known fill compositing sequences 740, and passed to the fill resolving module 750.

The set of known fill compositing sequences 740 therefore becomes:

TABLE 11

Set of known fill compositing sequences 740

| Entry | Fill Compositing Sequence | Reference to OEFCS (OEFCSRef) |
|---|---|---|
| 0 | A + W | 1 |
| 1 | $A_W$ | NULL |
| 2 | WhiteBkGnd | NULL |
| 3 | B + W | 4 |
| 4 | $B_W$ | NULL |
| 5 | A + B + W | — |

The fill compositing sequence (A+B+W) is passed to the fill compositing sequence resolving module 750 for analysis. Fills A and B are semi-transparent flat colors so the fill compositing sequence resolving module 750 determines that an optimised equivalent fill compositing sequence for (A+B+W) is the flat colour that results from compositing the transparent colour of fill A with the transparent colour of fill B with the white background. The resultant colour is $AB_W$.

The fill compositing sequence resolving module 750 searches the known fill compositing sequence table 740 to see if the resulting flat colour $AB_W$ has been generated elsewhere on the page 900. As it has not, the flat colour $AB_W$ is added to the known fill compositing sequence table 740 as a new fill compositing sequence and both the new fill compositing sequence ($AB_W$) and fill compositing sequence (A+B+W) are grouped together to mark them as equivalent.

The set of known fill compositing sequences 740 therefore becomes:

TABLE 12

Set of known fill compositing sequences 740

| Entry | Fill Compositing Sequence | Reference to OEFCS (OEFCSRef) |
|---|---|---|
| 0 | A + W | 1 |
| 1 | $A_W$ | NULL |
| 2 | WhiteBkGnd | NULL |
| 3 | B + W | 4 |
| 4 | $B_W$ | NULL |
| 5 | A + B + W | 6 |
| 6 | $AB_W$ | NULL |

The fill compositing sequence (A+B+W) is associated with edge 970 by adding a new entry in the edge behaviour table of edge 970 that references fill compositing sequence (A+B+W).

Processing continues on scanline 920 with the consideration of edge 985. At this point, fill B is deactivated. The resultant activated fill state is now (A+W). At this point, the known fill compositing sequence table 740 is searched for a fill compositing sequence entry (A+W), representing the combination of fill A and the white background. This entry is found so processing continues without needing to add the fill compositing sequence (A+W) to the set of known entries.

The fill compositing sequence (A+W) is associated with edge 985 by adding a new entry in the edge behaviour table of edge 985 that references fill compositing sequence (A+W).

Pre-processing continues on scanline 920 with consideration of edge 975 which deactivates fill A, leaving no fills active on the scanline.

The known fill compositing sequence table 740 is searched for a fill compositing sequence entry (WhiteBkGnd) representing no levels being active. This (WhiteBkGnd) entry is found so processing continues without needing to add the fill compositing sequence (WhiteBkGnd) to the set of known entries.

The fill compositing sequence (WhiteBkGnd) is already associated with edge 975 so no new entry is added to the edge behaviour table of edge 975, only the lifetime field is updated.

Pre-processing progresses in this way for scanline 930 and until scanline 940 is reached where edge 990 becomes active.

On scanline 940 fill A is activated as edge 990 is crossed. The resultant activated fill state (A+W) already exists in the known fill compositing sequence table 740. The fill compositing sequence (A+W) is therefore associated with edge 990 by adding an entry in the edge behaviour table of edge 990 that references fill compositing sequence (A+W).

Continuing across the scanline 940, edge 980 is crossed, and fill B is activated. The pixels between edge 980 and edge 995 use fill compositing sequence (A+B+W).

At this point, the known fill compositing sequence table 740 is searched for a fill compositing sequence entry (A+B+W), representing the combination of fill A, fill B, and the white background. As the fill compositing sequence (A+B+W) was previously encountered on scanline 920 at edge 970, that sequence already exists in the set of known fill compositing sequences 740.

The fill compositing sequence (A+B+W) is associated with edge 980 by adding a new entry in the edge behaviour table of edge 980 that references fill compositing sequence (A+B+W).

Processing continues on scanline 940 with the consideration of edge 995. At this point, fill A is deactivated. The resultant activated fill state is now (B+W). At this point, the known fill compositing sequence table 740 is searched for a fill compositing sequence entry (B+W), representing the combination of fill B and the white background. This entry is found so processing continues without needing to add the fill compositing sequence (B+W) to the set of known entries. The fill compositing sequence (B+W) is associated with edge 995 by adding a first entry in the edge behaviour table of edge 995 that references fill compositing sequence (B+W).

Pre-processing of scanline 940 continues with consideration of edge 985 which deactivates fill B, leaving no fills active on the scanline 940. The known fill compositing sequence table 740 is searched for a fill compositing sequence entry (WhiteBkGnd) representing no levels being active. This (WhiteBkGnd) entry is found so processing continues without needing to add the fill compositing sequence (WhiteBkGnd) to the set of known entries.

The fill compositing sequence (WhiteBkGnd) is already associated with edge 985 so no new entry is added to the edge behaviour table of edge 985, only the lifetime field is updated.

When the instruction job generator 640c comes to generate the instruction job 640f using the fill compositing sequence table 740 (Table 12), only entries 1, 2, 4, and 6, being entries with NULL entries in the OEFCSRef column, will be used to generate the fill table. Edge behaviour table entries originally referencing fill compositing sequences 0, 3, and 5 in the fill compositing sequence table will instead reference fills generated from entries 1, 4, and 6 respectively.

Figure 10:
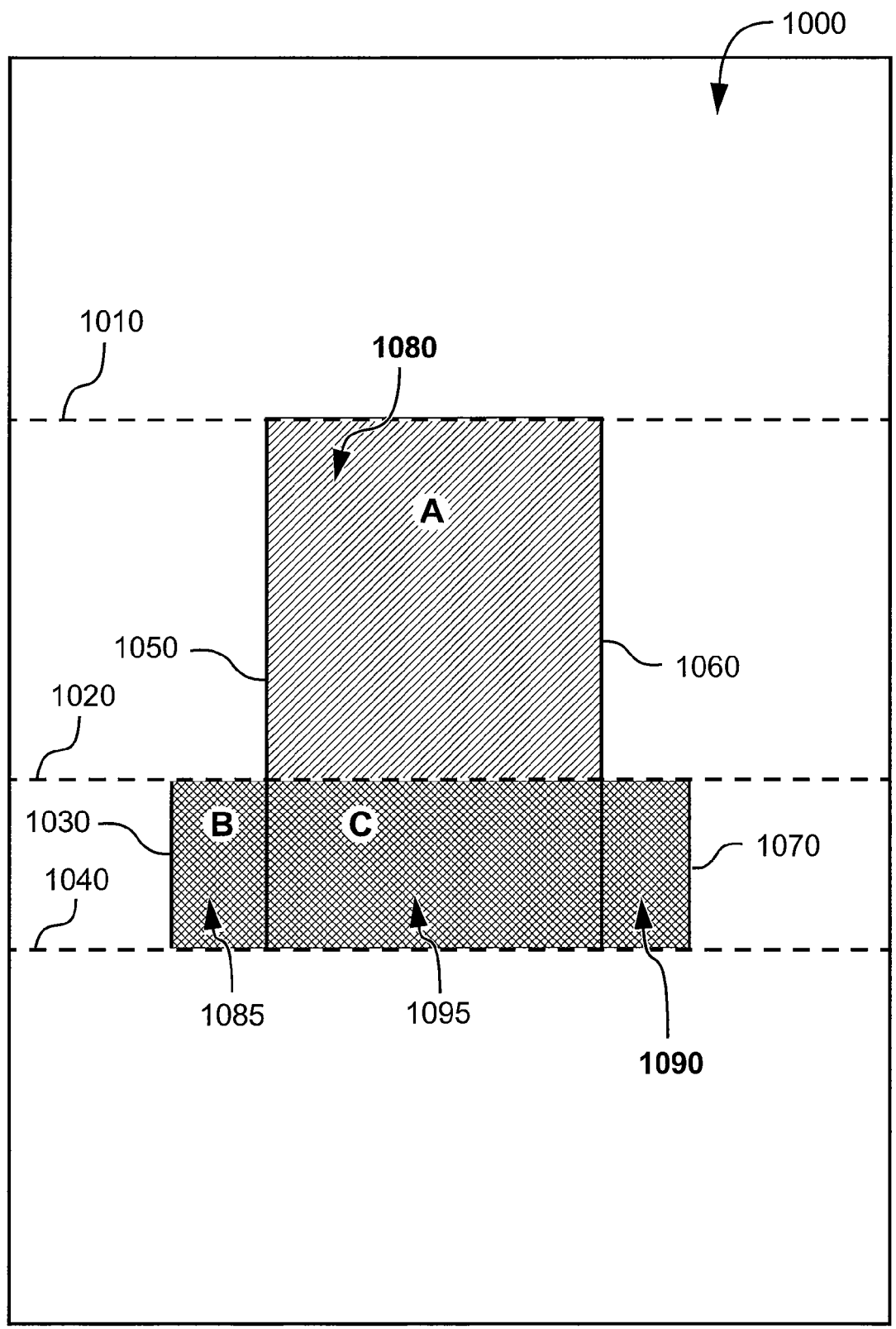

In a second example the use of equivalent fill compositing sequence regions are described with reference to FIG. 10 wherein a page 1000, containing 2 rectangles 1080 and 1090, is shown. The rectangle 1080 is filled with Fill A, and rectangle 1090, which overlaps rectangle 1080 between scanlines 1020 and 1040, is filled with Fill B.

Fill A is a fill consisting of a flat colour with 50% transparency. Fill B is a fill of a different flat colour, with transparency also 50%. The overlap region 1095 marked 'C' is filled with the result of compositing fill A and fill B. In this example the compositing operators are such that the operation produces pixels in region 1095 of a slightly different, but visually equivalent, colour to region 1085 marked 'B'.

On scanline 1010 edge 1050 is crossed, and fill A is enabled. At this point, the known fill compositing sequence table 740 is searched for a fill compositing sequence entry (A+W) representing the combination of fill A with the background.

Since this is the first time this fill compositing sequence has been encountered, that fill compositing sequence is not found. The fill compositing sequence (A+W) is therefore added to the known fill compositing sequence table 740.

The set of known fill compositing sequences 740 therefore becomes:

TABLE 13

| | Set of known fill compositing sequences 740 | |
| --- | --- | --- |
| Entry | Fill Compositing Sequence | Reference to OEFCS (OEFCSRef) |
| 0 | A + W | — |

The fill compositing sequence (A+W) is passed to the fill compositing sequence resolving module 750 for analysis. Fill A is a semi-transparent flat colour so the fill compositing sequence resolving module 750 determines that an optimised equivalent fill compositing sequence for (A+W) is the flat colour that results from compositing the transparent colour of fill A with the white background. The resultant colour is $A_W$.

The fill compositing sequence resolving module 750 searches the known fill compositing sequence table 740 to see if the resulting flat colour $A_W$ has been generated elsewhere on the page. As that colour has not been generated elsewhere, the flat colour $A_W$ is added to the known fill compositing sequence table 740 as a new fill compositing sequence, and both the new fill compositing sequence ($A_W$) and fill compositing sequence (A+W) are grouped together to mark them as equivalent.

The set of known fill compositing sequences 740 therefore becomes:

TABLE 14

| | Set of known fill compositing sequences 740 | |
| --- | --- | --- |
| Entry | Fill Compositing Sequence | Reference to OEFCS (OEFCSRef) |
| 0 | A + W | 1 |
| 1 | $A_W$ | NULL |

The fill compositing sequence (A+W) is associated with edge 1050 by adding an entry in the edge behaviour table of edge 1050 that references fill compositing sequence (A+W).

Pre-processing on scanline 1010 continues with consideration of edge 1060, which deactivates fill A. At this point, the known fill compositing sequence table 740 is searched for a fill compositing sequence entry (WhiteBkGnd) representing no levels being active. Since this is the first time this fill compositing sequence has been encountered, that fill compositing sequence is not found. The fill compositing sequence (WhiteBkGnd) is therefore added to the known fill compositing sequence table 740. The fill compositing sequence 'WhiteBkGnd' is passed to the fill compositing sequence resolving module 750 for analysis. The fill compositing sequence resolving module 750 determines that the OEFCS for 'WhiteBkGnd' is also 'WhiteBkGnd'. The OEFCSRef entry is therefore set to NULL. The set of known fill compositing sequences 740 becomes:

TABLE 15

| | Set of known fill compositing sequences 740 | |
| --- | --- | --- |
| Entry | Fill Compositing Sequence | Reference to OEFCS (OEFCSRef) |
| 0 | A + W | 1 |
| 1 | $A_W$ | NULL |
| 2 | WhiteBkGnd | NULL |

The fill compositing sequence (WhiteBkGnd) is associated with edge 1060 by adding an entry the edge behaviour table of edge 1060 that references fill compositing sequence (WhiteBkGnd).

On scanline 1020 edge 1030 is crossed, and fill B is enabled. At this point, the known fill compositing sequence table 740 is searched for a fill compositing sequence entry (B+W) representing the combination of fill B with the background.

Since this is the first time this fill compositing sequence has been encountered, that fill compositing sequence is not found. The fill compositing sequence (B+W) is therefore added to the known fill compositing sequence table 740.

The set of known fill compositing sequences 740 therefore becomes:

TABLE 16

| | Set of known fill compositing sequences 740 | |
| --- | --- | --- |
| Entry | Fill Compositing Sequence | Reference to OEFCS (OEFCSRef) |
| 0 | A + W | 1 |
| 1 | $A_W$ | NULL |
| 2 | WhiteBkGnd | NULL |
| 3 | B + W | — |

The fill compositing sequence (B+W) is passed to the fill compositing sequence resolving module 750 for analysis. Fill B is a semi-transparent flat colour so the fill compositing sequence resolving module 750 determines that an optimised equivalent fill compositing sequence for (B+W) is a flat colour called $B_W$ that results from compositing the colour of fill B with the background white.

The fill compositing sequence resolving module 750 searches the known fill compositing sequence table 740 to see if the resulting fill compositing sequence ($B_W$) has been generated elsewhere on the page. Because it has not, the fill compositing sequence $B_W$ is added to the known fill compositing sequence table 740 as a new fill compositing sequence. Both the new fill compositing sequence ($B_W$) and fill compositing sequence (B+W) are grouped together to mark them as equivalent.

The set of known fill compositing sequences 740 therefore becomes:

TABLE 17

Set of known fill compositing sequences 740

| Entry | Fill Compositing Sequence | Reference to OEFCS (OEFCSRef) |
|---|---|---|
| 0 | A + W | 1 |
| 1 | $A_W$ | NULL |
| 2 | WhiteBkGnd | NULL |
| 3 | B + W | 4 |
| 4 | $B_W$ | NULL |

The fill compositing sequence (B+W) is associated with edge 1030 by adding an entry in the edge behaviour table of edge 1030 that references fill compositing sequence (B+W).

Continuing across scanline 1020, edge 1050 is crossed, and fill A is activated. The pixels between edge 1050 and edge 1060 use fill compositing sequence (A+B+W). At this point, the known fill compositing sequence table 740 is searched for a fill compositing sequence entry (A+B+W), representing the combination of fill A, fill B, and the white background. Since the fill compositing sequence (A+B+W) has not previously been encountered, it is added to the table of known fill compositing sequences, and passed to the fill resolving module 750.

The set of known fill compositing sequences 740 therefore becomes:

TABLE 18

Set of known fill compositing sequences 740

| Entry | Fill Compositing Sequence | Reference to OEFCS (OEFCSRef) |
|---|---|---|
| 0 | A + W | 1 |
| 1 | $A_W$ | NULL |
| 2 | WhiteBkGnd | NULL |
| 3 | B + W | 4 |
| 4 | $B_W$ | NULL |
| 5 | A + B + W | — |

The fill compositing sequence (A+B+W) is passed to the fill compositing sequence resolving module 750 for analysis. Fill A and fill B are semi-transparent flat colour fills and the fill compositing sequence resolving module 750 determines that an optimised equivalent fill compositing sequence for (A+B+W) is the flat colour that results from compositing the transparent colour of fill A with the transparent colour of fill B with the white background. The resultant colour is $AB_W$.

The fill compositing sequence resolving module 750 searches the known fill compositing sequence table 740 for an optimised equivalent fill compositing sequence that is visually equivalent to the fill compositing sequence ($AB_W$). (Note that this search is carried out according to the variation of sub-step 1545 mentioned above). As the fill compositing sequence $B_W$ already appears in the known fill compositing sequence table 740, and the flat colours ($AB_W$) and ($B_W$) are visually equivalent, the fill compositing sequence ($AB_W$) is not added to the known fill compositing sequence table 740. However, both fill compositing sequence (A+B+W) and fill compositing sequence $B_W$ are grouped together to mark them as equivalent.

The set of known fill compositing sequences 740 therefore becomes:

TABLE 19

Set of known fill compositing sequences 740

| Entry | Fill Compositing Sequence | Reference to OEFCS (OEFCSRef) |
|---|---|---|
| 0 | A + W | 1 |
| 1 | $A_W$ | NULL |
| 2 | WhiteBkGnd | NULL |
| 3 | B + W | 4 |
| 4 | $B_W$ | NULL |
| 5 | A + B + W | 4 |

The fill compositing sequence (A+B+W) is associated with edge 1050 by adding an entry in the edge behaviour table of edge 1050 that references fill compositing sequence (A+B+W).

Continuing across scanline 1020, edge 1060 is crossed, and fill A is deactivated. The pixels between edge 1060 and edge 1070 use fill compositing sequence (B+W). At this point, the known fill compositing sequence table 740 is searched for a fill compositing sequence entry (B+W), representing the combination of fill B and the white background. Since the particular fill compositing sequence (B+W) has previously been encountered, that sequence is not added to the table of known fill compositing sequences.

The fill compositing sequence (B+W) is associated with edge 1060 by adding an entry in the edge behaviour table of edge 1060 that references fill compositing sequence (B+W).

Pre-processing continues with consideration of edge 1070, which deactivates fill B. At this point, the known fill compositing sequence table 740 is searched for a fill compositing sequence entry (WhiteBkGnd) representing no levels being active. This fill compositing sequence is found, resulting in the fill compositing sequence (WhiteBkGnd) not being added to the known fill compositing sequence table 740.

The fill compositing sequence (WhiteBkGnd) is also associated with edge 1070 by adding an entry in the edge behaviour table of edge 1070 that references fill compositing sequence (WhiteBkGnd).

When the instruction job generator 640c comes to generate the instruction job 640f using the fill compositing sequence table 740 (Table 19), only entries 1, 2, and 4, being entries with NULL entries in the OEFCSRef column, are used to generate the fill table. Edge behaviour table entries originally referencing fill compositing sequences 0, 3, and 5 in the fill compositing sequence table will instead reference fills generated from entries 1, 4, and 4 respectively. The generated fills in the instruction job 640f can either be the fill compositing sequences, if compositing is to be performed on the printer, or the fills resulting from compositing the fill compositing sequences, if the printer does not have the capability to perform compositing.

In addition the instruction job generator 640c generates edges from the second set of primitives by making copies of the edges in the second set of primitives with the following exceptions:
  edges in the second set of primitives whose associated edge behaviour table has the hidden attribute as always TRUE will not appear in the instruction job 640f; and
  if an edge in the second set of primitives has two or more segments that run for scanlines that fall within an entry whose hidden attribute is TRUE then those two or more segments are replaced by one straight line segment in the instruction job 640f.

Figure 12:
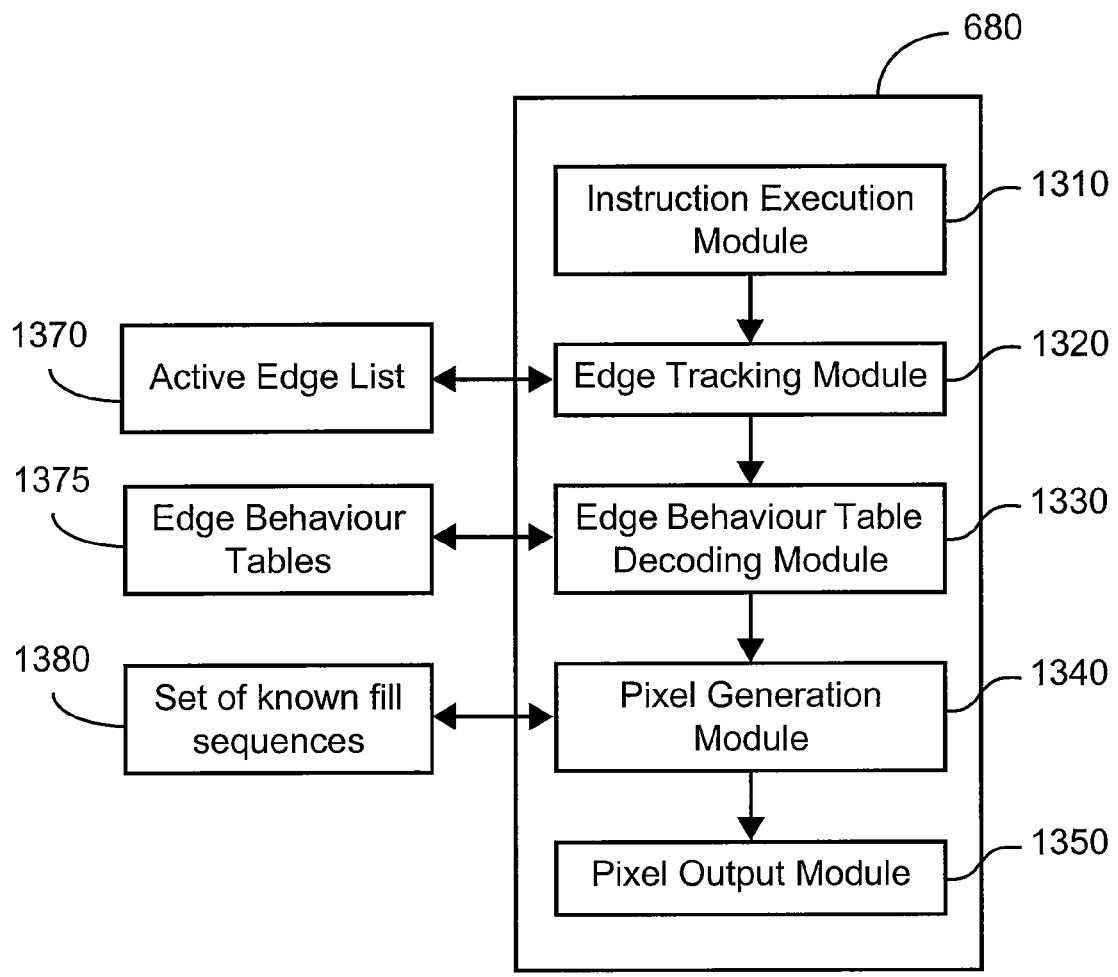
FIG. 12 illustrates the functional blocks of a pixel rendering apparatus in the pixel rendering system shown in FIG. 6.
Figure 13A:
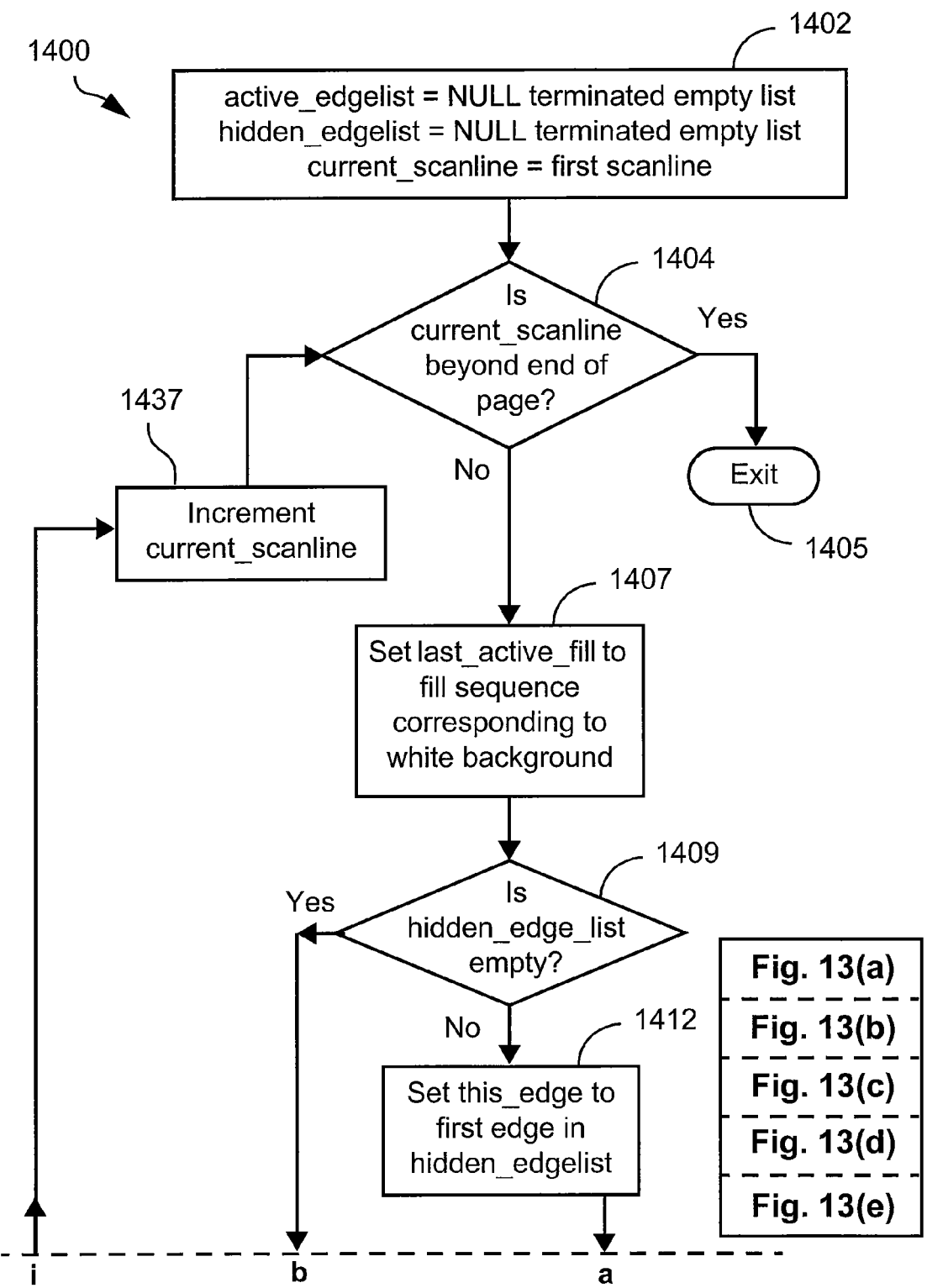
FIG. 13 shows a schematic flow diagram of a method, performed by the pixel rendering apparatus, of rendering a page.
Figure 13B:
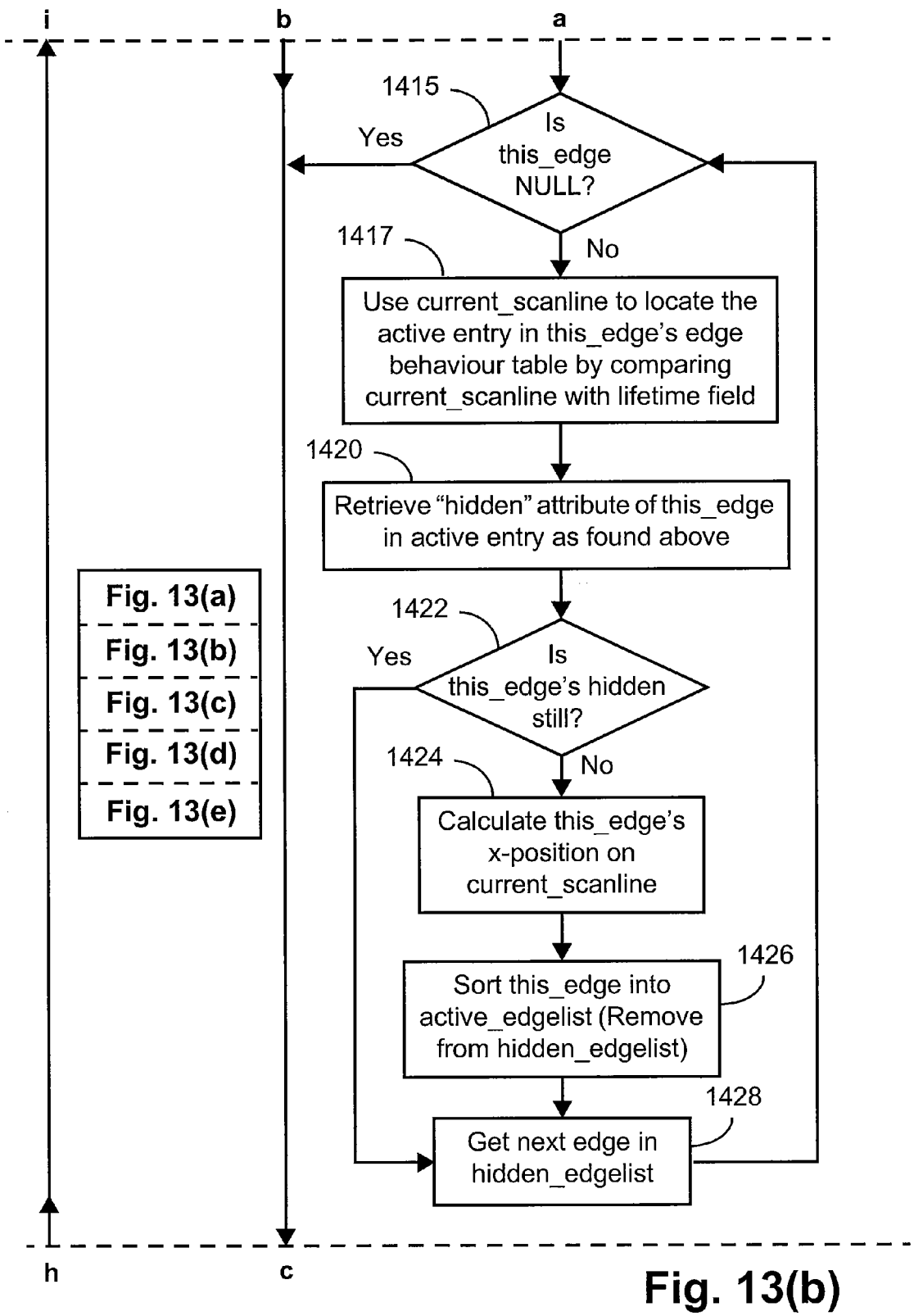
Figure 13C:
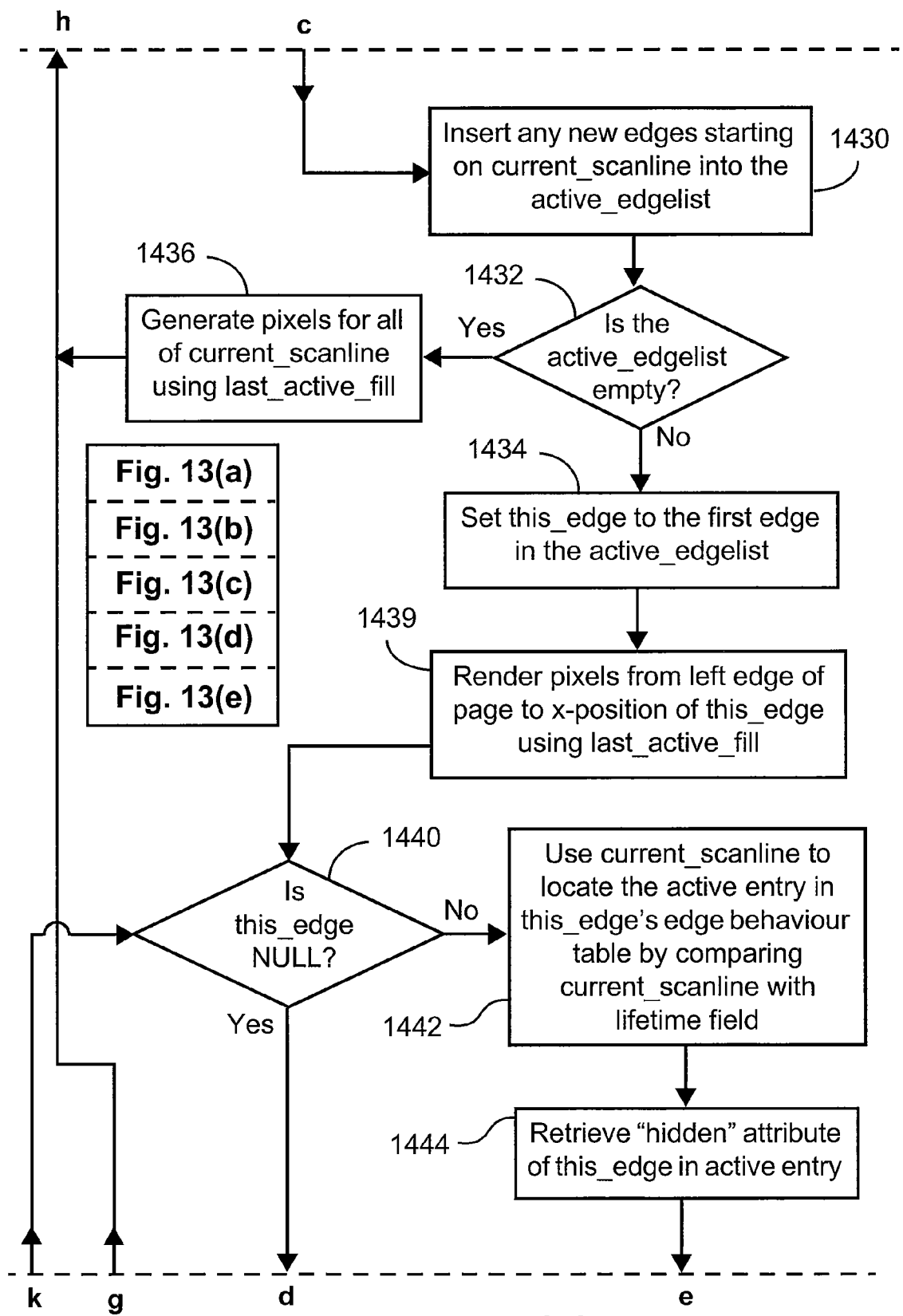
Figure 13D:
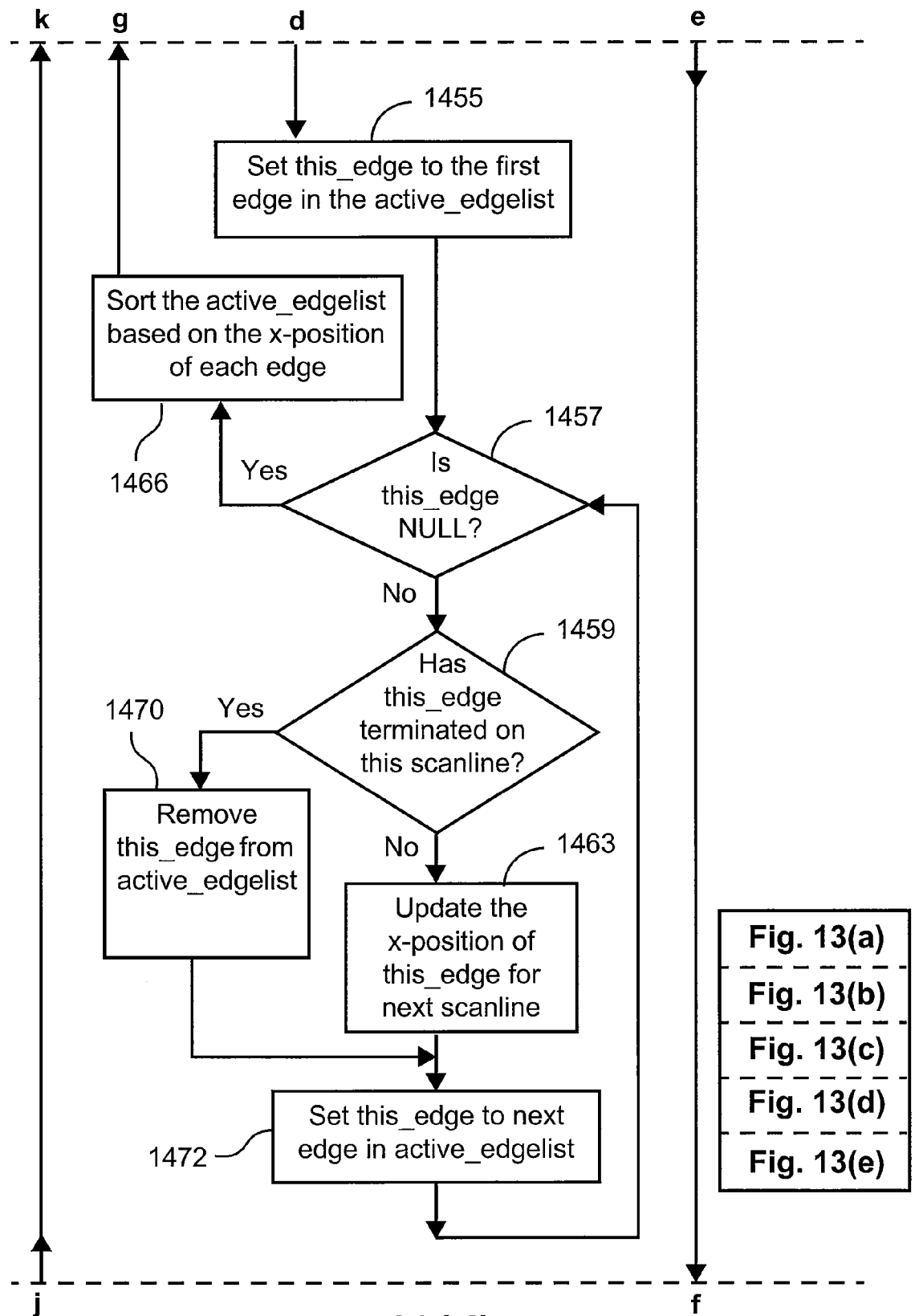
Figure 13E:
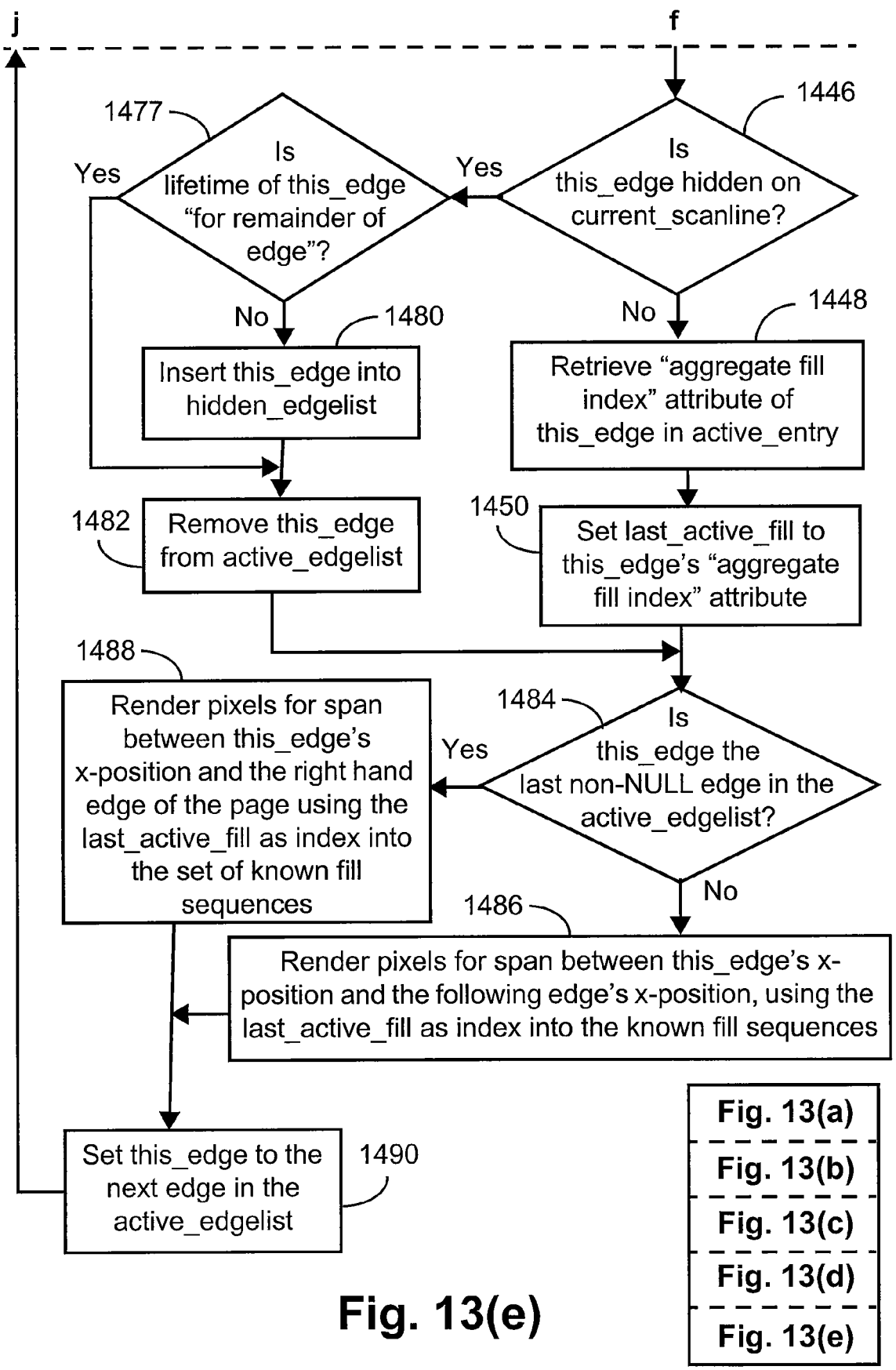

Having described the operation of the controller program 640 and the generation of the instruction job 640*f* in detail, the rendering apparatus 680 and the manner in which the rendering apparatus 680 processes the instruction job 640*f* is now described in detail. FIG. 12 shows a schematic block diagram of the pixel rendering apparatus 680 shown in FIG. 6. The pixel rendering apparatus 680 comprises an instruction execution module 1310; an edge tracking module 1320; an edge behaviour table decoding module 1330; a pixel generation module 1340; and a pixel output module 1350, arranged in a pipeline.

The instruction execution module 1310 reads and processes instructions from the instruction job 640*f* and formats the instructions into messages that are transferred to the other modules 1320 to 1350 within the pipeline. The edge tracking module 1320 is responsible for determining the edge that bounds the span of the currently scanned pixel using an active edge list 1370 that it maintains, and passes this information onto the edge behaviour table decoder module 1330. The edge behaviour table decoder 1330 module is pre-loaded with the edge behaviour tables 1375 from the instruction job 640*f*. The edge behaviour table decoder 1330 uses the corresponding edge behaviour table to determine whether or not the edge is hidden on a scanline and, if not, what entry in the set of known fill compositing sequences 1380 is required to generate the pixels on that scanline following each edge.

The pixel generation module 1340 is pre-loaded with the set of known fill compositing sequences 1380 from the instruction job 640*f*. The pixel generation module 1340, upon receiving a message from the edge behaviour table decoder module 1330, is responsible for retrieving the data in the appropriate fill compositing sequence entry, and using the data therein to generate a colour for inclusion in the message for forwarding onto the pixel output module 1350, which is subsequently passed to the printer engine 695.

FIG. 13 shows a schematic flow diagram of a method 1400, performed by the pixel rendering apparatus 680, of rendering a page described by the edges, set of known fill compositing sequences and edge behaviour tables created by the controlling program 640. The method 1400 starts at step 1402 where the edge tracking module 1320 (FIG. 12) initialises the active edge list 1370 and the hidden edge list to be null-terminated empty lists, and sets the current scanline to the first scanline on the page.

The edge tracking module 1320 then determines in step 1404 whether the current scanline is beyond the end of the page. If it is determined that the current scanline is in fact beyond the edge of the page, then the method 1400 terminates at step 1405. Alternatively, if it is determined that the current scanline has not yet reached the edge of the page then, in step 1407, the edge tracking module 1320 sets the last active fill to the fill compositing sequence corresponding to the background colour (typically white).

Following step 1407, in step 1409 the edge tracking module 1320 determines whether the hidden edge list is empty. If the hidden edge list is empty then the edge tracking module 1320 in step 1430 inserts any new edges (ie. those starting on the current scanline) into the active edge list 1370. The edge tracking module 1320 then determines whether the active edge list 1370 is empty in step 1432. If the active edge list 1370 is empty then, in step 1436, the pixel generation module 1340 generates pixels for the entire current scanline using the last active fill. The current scanline is incremented in step 1437 before execution in method 1400 returns to step 1404.

Referring again to step 1432, if the active edge list 1370 is determined not to be empty, then the edge tracking module 1320 at step 1434 loads the first edge in the active edge list 1370 into a variable this_edge. Execution proceeds to step 1439 where the pixel generation module 1340 renders pixels from the left edge of the page to the x-position of the edge loaded into the variable this_edge using the last active fill. Step 1440 follows where the edge tracking module 1320 determines whether the value of the variable this_edge is NULL, ie. whether the end of the active edge list 1370 has been reached.

If it is determined in step 1440 that the value of the variable this_edge is not NULL, the edge behaviour table decoding module 1330 in step 1442 then uses the current scanline to locate the active entry in the this_edge's edge behaviour table in the edge behaviour tables 1375 by comparing the current scanline with the lifetime field of each entry. Once the active entry has been located, the edge behaviour table decoding module 1330 retrieves the "hidden" attribute of the active entry in step 1444. The method 1400 then proceeds to step 1446 where the edge behaviour table decoding module 1330 determines whether the "hidden" attribute is true, indicating that the edge loaded into the variable this_edge is hidden on the current scanline. If the "hidden" attribute is determined to be true in step 1446, the edge behaviour table decoding module 1330 then determines in step 1477 whether the currently active entry in the edge's edge behaviour table has lifetime data equal to "for the remainder of the edge". If the current active entry in the edge's edge behaviour table does not have such a lifetime data entry, the edge tracking module 1320 then in step 1480 inserts the edge in the variable this_edge into the hidden edge list.

If it is determined in step 1477 that the current active entry in the edge's edge behaviour table does have a lifetime data entry equal to "for the remainder of the edge", or following step 1480, the edge tracking module 1320 in step 1482 removes the variable this_edge from the active edge list 1370.

If it was determined in step 1446 that the edge in the variable this_edge is not hidden, then the edge behaviour table decoding module 1330 in step 1448 retrieves the attribute of the active entry which indexes the fill compositing sequence for variable this_edge from the edge's edge behaviour table, and in step 1450 sets the last active fill to this value.

Following either step 1450 or step 1482, the pixel generation module 1340 in step 1484 determines whether the edge in the variable this_edge is the last non-NULL edge in the active edge list 1370, ie. whether the next edge in the active edge list 1370 is NULL. If it is determined that the next edge in the active edge list 1370 is not NULL, the pixel generation module 1340 in step 1486 renders pixels for the span between the x-position of the edge in the variable this_edge and the x-position of the next edge in the active edge list 1370 using the entry in the set of known fill compositing sequences 1380 indicated by the last active fill. Alternatively, if it is determined in step 1484 that the next edge in the active edge list 1370 is in fact NULL, then the pixel generation module 1340 in step 1488 renders pixels for the span between the x-position of the edge in the variable this_edge and the right hand edge of the page using the entry in the set of known fill compositing sequences 1380 indicated by the last active fill.

The amount of compositing required at steps 1486 and 1488 depends on the operation performed by the primitives processor 640*b* when the primitives processor 640*b* created the indicated fill compositing sequence entry in step 1589 (FIG. 11*c*). If the primitives processor 640*b* performed the compositing, the required fill is simply copied from the indicated fill compositing sequence entry by the pixel generation module 1340. Otherwise, the pixel generation module 1340 performs the compositing from the fills and operations contained in the indicated fill sequence entry.

Following either step 1486 or 1488, in step 1320 the edge tracking module 1320 sets the variable this_edge to the next edge in the active edge list 1370, and execution returns to step 1440.

If it is determined in step 1440 that the value of the variable this_edge is NULL, indicating the end of the active edge list 1370 has been reached, then method 1400 proceeds to step 1455 where the edge tracking module 1320 sets the variable this_edge to the first entry in the active edge list 1370. In step 1457 that follows the edge tracking module 1320 determines whether the value of the variable this_edge is NULL, ie. whether the end of the active edge list 1370 has been reached. If it is determined that the end of the active edge list 1370 has not been reached, the edge tracking module 1320 then in step 1459 determines whether the edge in the variable this_edge terminates on the current scanline. If it is determined that the edge in the variable this_edge does terminate on the current scanline, then in step 1470 the edge tracking module 1320 removes this_edge from the active edge list 1370. In the case where it is determined in step 1459 that the edge in the variable this_edge does not terminate on the current scanline, the edge tracking module 1320 updates the x-position of the variable this_edge for the next scanline in step 1463.

Following either step 1463 or step 1470, in step 1472 the edge tracking module 1320 sets the variable this_edge to the next entry in the active edge list 1370, and the method 1400 returns control to step 1457.

If it is determined in step 1457 that the value of the variable this_edge is NULL, indicating that the end of the active edge list 1370 has been reached, the edge tracking module 1320 in step 1466 sorts the active edge list based on the x-position of each active edge on the next scanline. Execution of the method 1400 then returns to step 1404 via step 1437.

Referring again to step 1409, if the edge tracking module 1320 determines that the hidden edge list is not empty, then in step 1412 the edge tracking module 1320 sets the variable this_edge to the first edge in the hidden edge list. In the following step 1415, the edge tracking module 1320 determines whether the value of variable this_edge is NULL, indicating that the end of the hidden edge list has been reached. If the end of the hidden edge list has been reached, then the method 1400 continues to step 1430. If it is determined in step 1415 that the value of variable this_edge is not NULL, that is the end of the hidden edge list has not been reached, the edge behaviour table decoding module 1330 in step 1417 uses the current scanline to locate the active entry in the this_edge's edge behaviour table by comparing the current scanline with the lifetime field of each entry. Once the active entry has been located, the edge behaviour table decoding module 1330 retrieves the "hidden" attribute of the active entry in step 1420.

Execution proceeds to step 1422 where the edge behaviour table decoding module 1330 determines whether the "hidden" attribute is true, indicating that the edge in the variable this_edge is still hidden on the current scanline. If the edge in the variable this_edge is no longer hidden, the edge tracking module 1320 in step 1424 calculates the x-position on the current scanline of the edge in the variable this_edge. Also, the edge tracking module 1320 in step 1426 inserts the edge in the variable this_edge into the active edge list 1370 based on its calculated x-position, and removes the edge in the variable this_edge from the hidden edge list. If it is determined in step 1422 that the edge in the variable this_edge is still hidden, or following step 1426, the edge behaviour table decoding module 1330 then sets the variable this_edge to the next entry in the hidden edge list before the method 1400 returns to step 1415.

The effect of steps 1477 to 1482 and 1417 to 1426 is that an edge that starts as, or becomes, hidden is discarded unless it is known to become un-hidden at a later scanline. In this case, the edge is added to the hidden edge list, where its x-position is not tracked between scanlines and that edge cannot affect the last active fill variable. Once the edge becomes un-hidden the edge rejoins the active edge list in the correct location according to its newly updated x-position. This saves both tracking and sorting computation on the active edge list 1370 by restricting these operations to non-hidden edges on any scanline.

Figure 9:
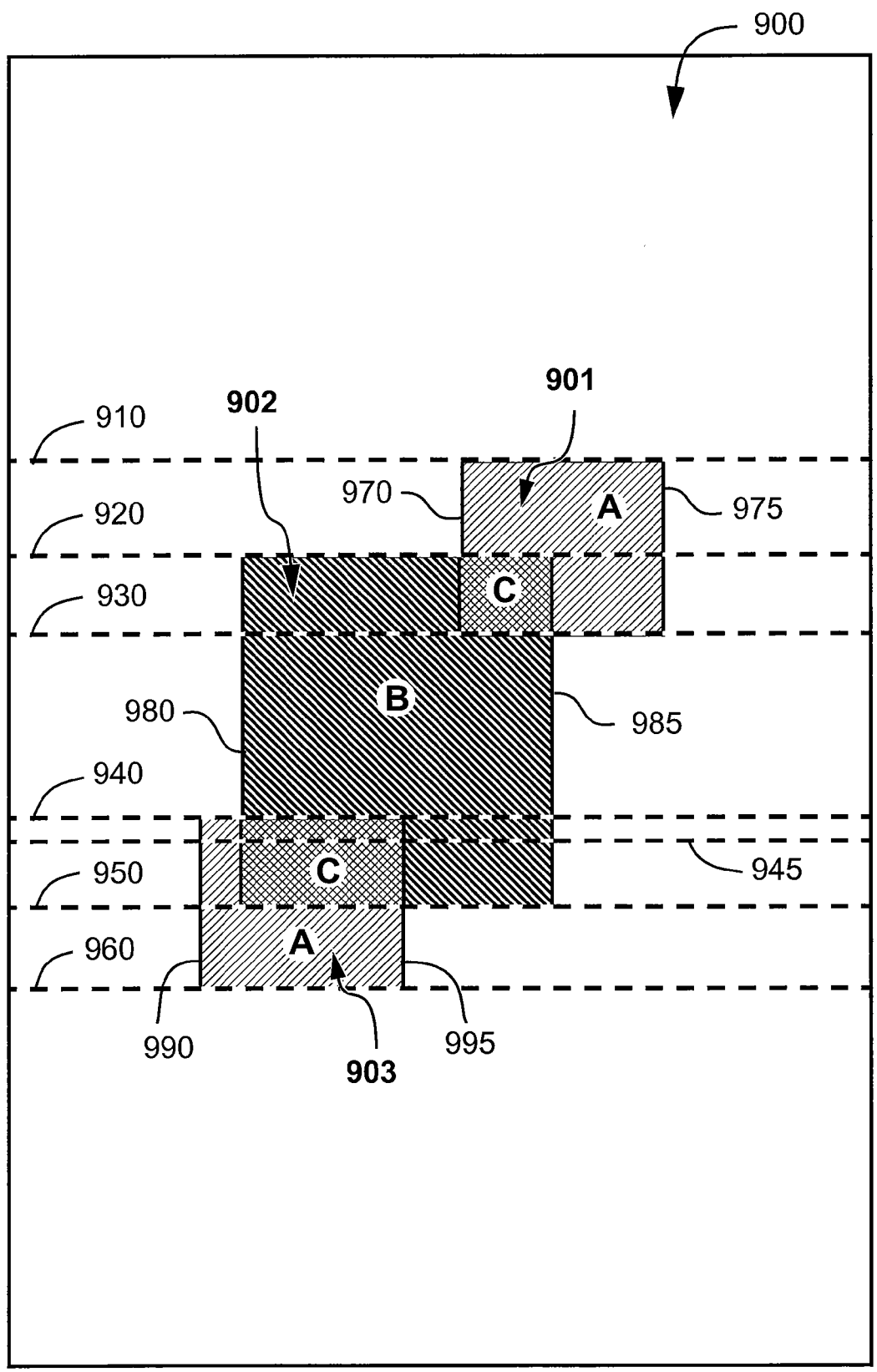
FIG. 9 and 10 illustrate schematically pages containing two overlapping objects for the purposes of illustrating how the pixel rendering system shown in FIG. 6 renders such pages.

The operation of the pixel rendering apparatus 680 is further illustrated by way of example with reference to page 900 shown in FIG. 9, and in particular the rendering of scanline 945. Reference is also made to table 19 wherein the set of known fill compositing sequences created for objects 901, 902 and 903 in FIG. 9 are shown.

The edge behaviour tables of the edges 970, 975, 980, 985, 990 and 995 are as follows:

TABLE 20

Edge Behaviour Table for edge 970 in FIG. 9

| Entry Lifetime (Relative) | Attribute 1 (fill sequence index) | Attribute 2 (hidden flag) |
| --- | --- | --- |
| scanline 910 to scanline 920 | Index 1 ($A_W$) | FALSE |
| For the remainder of the edge | Index 6 ($AB_W$) | FALSE |

TABLE 21

Edge Behaviour Table for edge 975 in FIG. 9

| Entry Lifetime (Relative) | Attribute 1 (fill sequence index) | Attribute 2 (hidden flag) |
| --- | --- | --- |
| For the remainder of the edge | Index 2 (WhiteBkGnd) | FALSE |

TABLE 22

Edge Behaviour Table for edge 980 in FIG. 9

| Entry Lifetime (Relative) | Attribute 1 (fill sequence index) | Attribute 2 (hidden flag) |
| --- | --- | --- |
| scanline 920 to scanline 940 | Index 4 ($B_W$) | FALSE |
| For the remainder of the edge | Index 6 ($AB_W$) | FALSE |

TABLE 23

Edge Behaviour Table for edge 985 in FIG. 9

| Entry Lifetime (Relative) | Attribute 1 (fill sequence index) | Attribute 2 (hidden flag) |
| --- | --- | --- |
| scanline 920 to scanline 930 | Index 1 ($A_W$) | FALSE |
| For the remainder of the edge | Index 2 (WhiteBkGnd) | FALSE |

TABLE 24

Edge Behaviour Table for edge 990 in FIG. 9

| Entry Lifetime (Relative) | Attribute 1 (fill sequence index) | Attribute 2 (hidden flag) |
| --- | --- | --- |
| For the remainder of the edge | Index 1 ($A_W$) | FALSE |

TABLE 25

Edge Behaviour Table for edge 995 in FIG. 9

| Entry Lifetime (Relative) | Attribute 1 (fill sequence index) | Attribute 2 (hidden flag) |
| --- | --- | --- |
| scanline 940 to scanline 950 | Index 4 ($B_W$) | FALSE |
| For the remainder of the edge | Index 2 (WhiteBkGnd) | FALSE |

The first edge encountered on scanline 945 is edge 990. The pixel rendering apparatus 680 generates white pixels for scanline 945 from the left hand edge of the page 900 until the x-position of edge 990 on scanline 945.

The pixel rendering apparatus 680 then determines the length of the span between edge 990 and the next edge on scanline 945, which is edge 980. The entry of the set of known fill compositing sequences (Table 12) that has to be used to generate the pixel colours for the span between edge 990 and edge 980 is determined by finding the currently active edge behaviour table entry for edge 990 (Table 24) on scanline 945. The edge behaviour table entry that is active for scanline 945 is the first entry in Table 24. The fill sequence index corresponding to edge 990 in its edge behaviour table is Index 1 ($A_W$). This fill sequence entry is therefore used to generate the pixels for the span between edge 990 and edge 980.

The pixel rendering apparatus 680 next determines the length of the span between edge 980 and the next edge on scanline 945, edge 995. The fill sequence entry that is used to generate the pixel colours for this span is determined by finding the currently active edge behaviour table entry for edge 980 on scanline 945.

Given that the lifetime entries for the edge behaviour table for edge 980 are relative to the start of edge 980, the edge behaviour table entry that is active for scanline 945 is calculated to be the second entry in Table 22.

The fill sequence index for edge 980 in edge 980's edge behaviour table is Index 6 ($AB_W$). This fill sequence entry is therefore used to generate the pixels for the span between edge 980 and edge 995.

The pixel rendering apparatus 680 then determines the length of the span between edge 995 and the next edge on scanline 945, edge 985. The fill sequence entry that has to be used to generate the pixel colours for this span is determined by finding the currently active edge behaviour table entry for edge 995 on scanline 945. The edge behaviour table entry that is active for scanline 945 is calculated to be the first entry in Table 25. The fill sequence index for edge 995 in edge 995's edge behaviour table is Index 4 ($B_W$), which is used to generate the pixels for the span between edge 995 and edge 985.

Finally the pixel rendering apparatus 680 determines the length of the span between edge 985 and the right hand side of the page, since there are no more edges encountered following edge 985 on scanline 945. The fill sequence entry that must be used to generate the pixel colours for this span is determined by finding the currently active edge behaviour table entry for edge 985 on scanline 945, which is calculated to be the second entry in Table 23. The fill sequence index for edge 985 in edge 985's edge behaviour table is Index 2 (WhiteBkGnd), which is used to generate the pixels in a flat white colour for the span between edge 985 and the right hand side of the page 900.

Referring again to system 600 (FIG. 6), by describing the operation of the pixel rendering system 600 in detail, computer programs are also implicitly disclosed in that it would be apparent to the person skilled in the art that the individual steps described herein are to be put into effect by computer code. The computer programs are not intended to be limited to any particular control flow.

Such computer programs may be stored on any computer readable medium. The computer readable medium may include storage devices such as magnetic or optical disks, memory chips, or other storage devices suitable for interfacing with a processor. The computer programs when loaded and executed on such processors results in the respective component parts of system 600 described herein.

It is also noted that the foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

We claim:

1. A method of generating a representation of a page to be rendered, said page comprising one or more graphic objects, each graphic object being defined by two or more edges bounding a fill, said fill defining the colour at each pixel location within said edges, said method comprising the steps of:

partitioning said page into a plurality of regions, each said region having a distinct corresponding fill sequence comprising a plurality of fills adapted to be composited to generate a colour at each pixel location within said region upon rendering; and generating said representation including a reference from each said region to a corresponding fill sequence such that at least two regions reference a common fill sequence.

2. The method according to claim 1, wherein the common fill sequence is the same as the fill sequence corresponding to at least one of said at least two regions.

3. The method according to claim 1, wherein the common fill sequence is an optimised equivalent of the fill sequence corresponding to one of said at least two regions, said optimised equivalent fill sequence requiring fewer compositing operations than said corresponding fill sequence.

4. The method according to claim 3, wherein said optimised equivalent fill sequence is obtained by removing at least two cancelling fills from said corresponding fill sequence.

5. The method according to claim 3, wherein said optimised equivalent fill sequence consists of a single opaque fill obtained by compositing said corresponding fill sequence.

6. The method according to claim 5, wherein said single opaque fill is drawn from the group consisting of:

a flat colour;

a linear colour blend; and a bitmap image.

7. The method according to claim 1, wherein each said region is represented in said representation as an entry referenced by a first edge forming part of the boundary of said region, said entry comprising:
said reference to said corresponding fill sequence, and
lifetime data indicating a set of scanlines over which said first edge bounds said region.

8. The method according to claim 1, wherein each said region is represented in said representation as an edge segment forming part of the boundary of said region, said edge segment referencing said corresponding fill sequence.

9. The method according to claim 1, wherein said generating step further comprises replacing each said reference with a reference to a resultant fill obtained by compositing said corresponding fill sequence.

10. A computer program product comprising machine-readable program code recorded on a machine-readable recording medium, for controlling the operation of a data processing apparatus on which the program code executes to perform a method of generating a representation of a page to be rendered, said page comprising one or more graphic objects, each graphic object being defined by two or more edges bounding a fill, said fill defining the colour at each pixel location within said edges, said method comprising the steps of:
partitioning said page into a plurality of regions, each said region having a distinct corresponding fill sequence comprising a plurality of fills adapted to be composited to generate a colour at each pixel location within said region upon rendering; and
generating said representation including a reference from each said region to a corresponding fill sequence such that at least two regions reference a common fill sequence.

11. Apparatus for generating a representation of a page to be rendered, said page comprising one or more graphic objects, each graphic object being defined by two or more edges bounding a fill, said fill defining the colour at each pixel location within said edges, said apparatus comprising:
means for partitioning said page into a plurality of regions, each said region having a distinct corresponding fill sequence comprising a plurality of fills adapted to be composited to generate a colour at each pixel location within said region upon rendering; and
means for generating said representation including a reference from each said region to a corresponding fill sequence such that at least two regions reference a common fill sequence.

12. A method of rendering a page, said page comprising one or more graphic objects, each graphic object being defined by two or more edges bounding a fill, said fill defining the colour at each pixel location within said edges, said method comprising the steps of:
receiving a representation of said page, said representation comprising:
data identifying a plurality of regions; and
a corresponding fill sequence for each region, each said fill sequence adapted to be composited to generate a colour at each pixel location within said region upon rendering, wherein at least two regions reference a common fill sequence;
determining from said data identifying said plurality of regions the pixel locations at which a current scanline crosses boundaries of said regions;
associating with each span of pixels in said current scanline one of said regions, each span of pixels being defined by two of said pixel locations; and
rendering said spans of pixels on said current scanline using the fill compositing sequence corresponding to the identified region.

13. A computer program product comprising machine-readable program code recorded on a machine-readable recording medium, for controlling the operation of a data processing apparatus on which the program code executes to perform a method of rendering a page, said page comprising one or more graphic objects, each graphic object being defined by two or more edges bounding a fill, said fill defining the colour at each pixel location within said edges said method comprising the steps of:
receiving a representation of said page, said representation comprising:
data identifying a plurality of regions; and
a corresponding fill sequence for each region, each said fill sequence adapted to be composited to generate a colour at each pixel location within said region upon rendering, wherein at least two regions reference a common fill sequence;
determining from said data identifying said plurality of regions the pixel locations at which a current scanline crosses boundaries of said regions;
associating with each span of pixels in said current scanline one of said regions, each span of pixels being defined by two of said pixel locations; and
rendering said spans of pixels on said current scanline using the fill compositing sequence corresponding to the identified region.

14. A renderer for rendering a page, said page comprising one or more graphic objects, each graphic object being defined by two or more edges bounding a fill, said fill defining the colour at each pixel location within said edges said renderer comprising:
means for receiving a representation of said page, said representation comprising:
data identifying a plurality of regions; and
a corresponding fill sequence for each region, each said fill sequence adapted to be composited to generate a colour at each pixel location within said region upon rendering wherein at least two regions reference a common fill sequence;
means for associating with each span of pixels in said current scanline one of said regions, each span of pixels being defined by two of said pixel locations; and
means for rendering said spans of pixels on said current scanline using the fill compositing sequence corresponding to the identified region.

* * * * *